(12) United States Patent
Edwards et al.

(10) Patent No.: US 11,592,806 B2
(45) Date of Patent: *Feb. 28, 2023

(54) INDUSTRIAL ROBOTICS SYSTEMS AND METHODS FOR CONTINUOUS AND AUTOMATED LEARNING

(71) Applicant: Plus One Robotics, Inc., San Antonio, TX (US)

(72) Inventors: Shaun Edwards, San Antonio, TX (US); Paul Hvass, San Antonio, TX (US); Erik Nieves, San Antonio, TX (US); Austin Deric, San Antonio, TX (US); Jonathan Lwowski, San Antonio, TX (US)

(73) Assignee: PLUS ONE ROBOTICS, INC., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,061

(22) Filed: Jun. 1, 2021

(65) Prior Publication Data

US 2021/0286342 A1      Sep. 16, 2021

Related U.S. Application Data

(63) Continuation of application No. 16/840,384, filed on Apr. 4, 2020, now Pat. No. 11,022,961.

(60) Provisional application No. 62/829,613, filed on Apr. 4, 2019.

(51) Int. Cl.
    *G05B 19/00*       (2006.01)
    *G05B 19/418*      (2006.01)
    *G06N 20/00*       (2019.01)

(52) U.S. Cl.
    CPC ..... *G05B 19/4183* (2013.01); *G05B 19/4185* (2013.01); *G05B 19/41885* (2013.01); *G06N 20/00* (2019.01)

(58) Field of Classification Search
    None
    See application file for complete search history.

(56) References Cited

U.S. PATENT DOCUMENTS

| | | | |
|---|---|---|---|
| 11,022,961 B2* | 6/2021 | Edwards | G05B 19/4185 |
| 2017/0021499 A1* | 1/2017 | Wellman | G06Q 10/08 |
| 2017/0136632 A1* | 5/2017 | Wagner | B25J 9/1664 |

* cited by examiner

*Primary Examiner* — Paul B Yanchus, III
(74) *Attorney, Agent, or Firm* — Outlier Patent Attorneys

(57) ABSTRACT

In an aspect of the disclosure, a method, a computer-readable medium, and an apparatus are provided. The apparatus may maintain an first dataset configured to select pick points for objects. The apparatus may receive, from a user device, a user dataset including a user selected pick point associated with at least one object and a first image of the at least one first object. The apparatus may generate a second dataset based at least in part on the first dataset and the user dataset. The apparatus may receive a second image of a second object. The apparatus may select a pick point for the second object using the second dataset and the second image of the second object. The apparatus may send information associated with the pick point selected for the second object to a robotics device for picking up the second object.

20 Claims, 19 Drawing Sheets

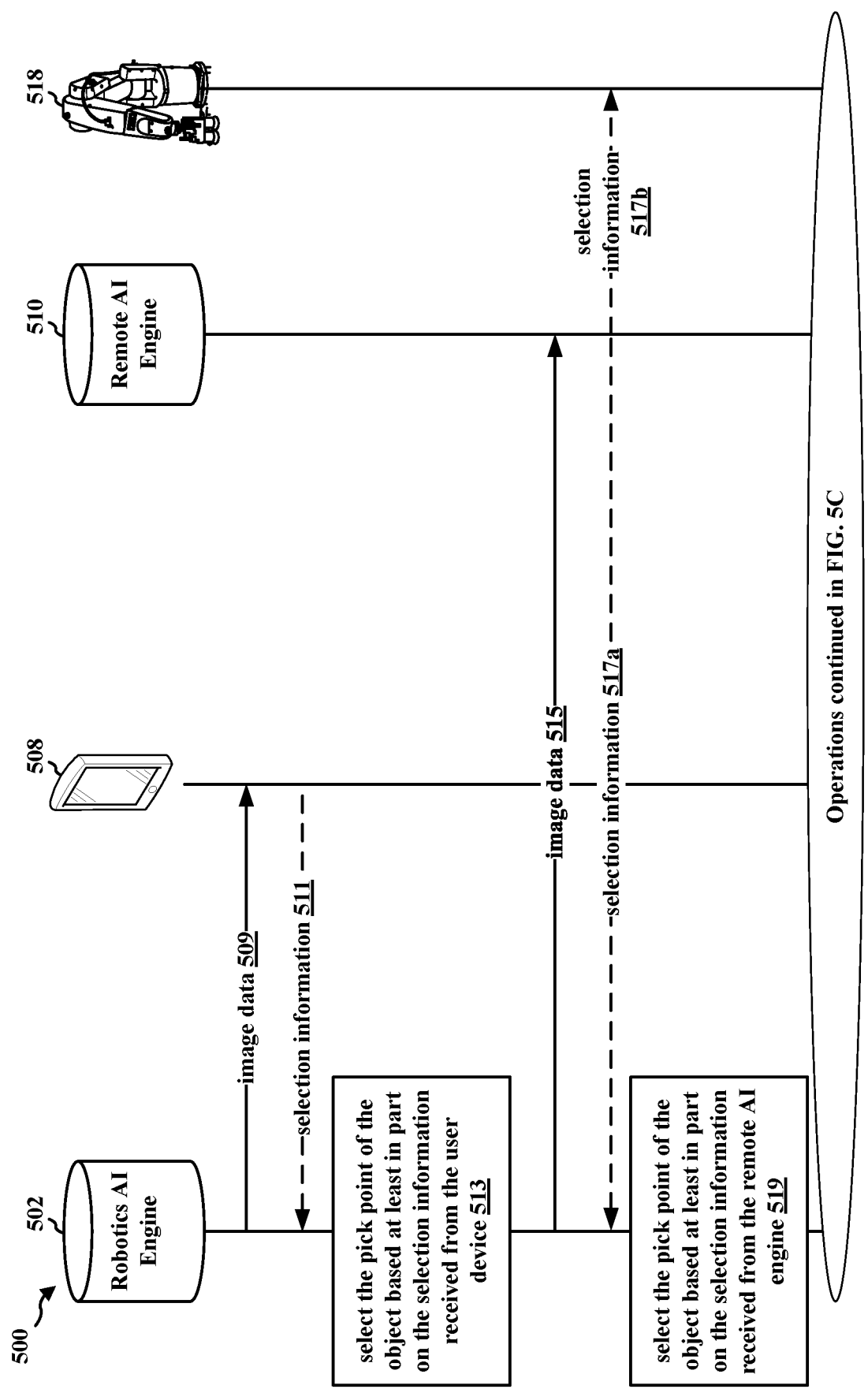

INDUSTRIAL ROBOTICS SYSTEMS AND METHODS FOR CONTINUOUS AND AUTOMATED LEARNING

CROSS-REFERENCE TO RELATED APPLICATION(S)

This application claims the benefit of U.S. Provisional Application Ser. No. 62/829,613, entitled "APPLYING TRUSTED FEEDBACK SOURCES FOR ACCELERATED LEARNING IN INDUSTRIAL PICKING SYSTEMS" and filed on Apr. 4, 2019, which is expressly incorporated by reference herein in its entirety.

BACKGROUND

Field

The present disclosure relates generally to robotic picking systems. More specifically, the present invention relates to a human-in-the-loop picking system for efficient picking of objects.

Background

Currently available industrial picking systems, for picking stationary items or items traveling on, for example, a conveyor belt, offer limited rescue operations if a picking robot is unable to select a pick point on an object for relocation and/or removal. Some prior art systems offer a teleoperation intervention system, which permits individual operators to temporarily control the robot and manually pick up an object. These systems are reasonably effective at providing an intervention. However, these systems are not scalable. For example, these systems quickly become overwhelmed if several robots simultaneously request human intervention. As such, these systems require a certain robot-to-human-operator ratio. Moreover, these systems require a very low system latency to enable operators to teleop into the system and take over the robot's operation. The operator teleop feature of such systems usually require human operators to be located on-premises with the robot, or, at the very least, severely limit where the human operators may be located. As a result, currently available industrial picking systems are severely limited.

In addition, currently available robotic picking systems make it virtually impossible to quickly learn from edge cases and un-pickable items in an and continuous learning loop. More specifically, AI based robotic systems run into a variety of issues related edge cases, drift, skew, bias, etc. when deployed in real-world applications. As such, it is virtually impossible for robotics AI systems to learn from and correct for these errors in a continuous and automatic fashion. For example, "dataset drift" occurs when machine learning models are passed new inputs that include new variables values, and/or skew in data that is no longer representative of the distribution of data in the offline training dataset, which are not present in training datasets, or new data that is not representative of the training data. This may occur because of a sample selection bias, or because of non-stationary environments wherein the underlying data changes because of a variety of factors, including but not limited to, instances where an adversary tries to work around the existing classifier's learned concepts, or where new data is simply not representative of training data. In other instances, drifts may occur, for example, because of changes in population distribution over time, changes in distribution of a class variable, or changes to definitions of a class, i.e. a changing context that can induce changes in target concepts.

Data scientists have been trying to account for, recognize, debug, and determine mitigation strategies for various types of drift. In one instance, machine learning systems have adopted classifiers that can be updated incrementally with new data. But this methodology raises new concerns about whether a learning system can be designed to remain stable and remain immune to irrelevant events (e.g., outliers), while being adaptive to new, important data (e.g., changes in concepts). Others have tried to solve the problem algorithmically by, for example, using the log likelihood function, importance-weighted cross-validation, asymptotic Bayesian generalization error, discriminative learning, kernel mean matching, or adversarial search. Other approaches include determining the existence and/or shape of dataset shift between two datasets.

But none of these approaches work in real-time, non-stationary environments. Currently, it is virtually impossible for robotics systems to detect drift and/or other types of variance in real-time between an on-line classifier and an off-line learning models. As a result, on-line classifiers are updated very slowly in a non-continuous manner. For example, current systems require manual comparisons of offline data/scoring to online data/scoring, but those comparisons tend to be very tedious, and require highly complex debugging and troubleshooting to determine if even a problem exists. Significant additional resources may be required to pinpoint the root cause of the drift. The business costs and risks associated with current systems are significant, and the technical difficulties with doing so are overwhelming. As a result, robotics AI systems continue to require significant human oversight and intervention capabilities to deal with edge cases and the various other problems outlined above.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As mentioned above, industrial automated picking systems require significant human intervention when the picking operation breaks down. There are a variety of reasons for this, including, for example, the nature of breakdowns. Generally, in large scale industrial picking systems, breakdowns tend to be varied (i.e. breakdowns are often dissimilar), and, as such, corrective measures necessary to solve the breakdown are also varied. As a result, it is often difficult to successfully intervene without applying human judgment, creativity, and insight. The present inventive systems and methods overcome these limitations by leveraging multiple AI engines that enable the system to leverage human intervention and successfully deploy those learnings in a real-time picking environment without breaking the system. This is an improvement over the prior art, which typically require lengthy learning loops in an offline environment and complex debugging and large data analysis before the offline learnings are transferred to a real-time decisioning system. In contrast, the present invention enables learning by using a human-in-the-loop system to quickly and automatically transfer those learnings in a real-time decisioning system.

In other words, the present disclosure provides a solution by enabling trusted human operators to intervene on a limited basis when the picking system is unable to pick items in a pick station, which may be comprised of, for example, but not limited to, a picking bin, a conveyor, a tote, etc. that a robot can pick from. However, the inventive solution of the present invention prevents the system from overwhelming human operators, which may otherwise cause the system to temporarily shut down or pause until human intervention catches up to requests for interventions. Moreover, the accuracy testing/validation in comparison to a prior model, which is a feature of the inventive system and method, enables the AI picking system to be updated safely without introducing drift, bias, or other errors that may seep into a model when generating a new learning model based on new incoming requests.

In one embodiment of the invention, a robotics AI system uses an AI engine to identify pick points for one or more objects that may be present within a pickable region of a pick station. If the robotics AI engine is unable to select pick points with reasonable certainty, then it may request intervention. In accordance with an embodiment of the invention, when intervention is requested, typically, a human operator is provided with an image of the pick station. The human operator may provide pick points for enabling effective robotic picking of one or more objects that are represented in the image. In one embodiment, the user selected pick points and the image are thereafter provided to a remote AI engine that updates an initial dataset (hereinafter, also referred to as first dataset, an initial training model, etc.) that was being used at the robotics AI system. The updated initial dataset may be a new dataset (hereinafter, also referred to as a second dataset, updated initial dataset, new dataset, etc.). This new dataset typically includes a solution (as derived from the user input) for picking items that the initial dataset was unable or ineffective at generating. The robotics AI engine performs additional thresholding/accuracy tests to ensure that the upgraded performance with respect to new functionality has not materially degraded performance with regards to old functionality (i.e. items that were pickable via the initial dataset are still pickable—within a threshold—via the updated dataset). If the new model passes muster, then it is immediately and automatically deployed to the real-time picking environment. This is a significant improvement over the prior art, which, generally, and by way of background, enabled learning or training to occur in an off-line training dataset. Generally, training that uses conventional techniques may not occur on-line in a runtime environment due to the risk of breaking the initial dataset by, for example, introducing errors, drift, biases, null/void values, etc. into the initial dataset from untrusted data sources. As a result, training generally occurs off-line. Some prior art systems have tried to solve for that applying reinforcement learning. However, reinforcement learning is generally black-box in nature, and is not predictable.

The remote AI engine of the present disclosure may solve these issues by using data from trusted sources (e.g., the user selected pick points) and by applying thresholding/accuracy tests to evaluate a new model against a prior model that is in deployment to enable on-line learning that has a low risk of degrading the predictive capabilities of the initial dataset.

In an aspect of the disclosure, a method, a computer-readable medium, and an apparatus are provided. The apparatus (e.g., a remote AI engine) may maintain a first dataset configured to select pick points for objects. The apparatus may receive, from a user device, a user dataset including a user selected pick point associated with at least one object and a first image of the at least one first object. The apparatus may generate a second dataset based at least in part on the first dataset and the user dataset, the second dataset configured to select pick points for a larger variety of objects than the first dataset. The apparatus may receive a second image of a second object. The apparatus may select a pick point for the second object using the second dataset and the second image of the second object. The apparatus may send information associated with the pick point selected for the second object to a robotics device for picking up the second object.

In certain other implementations, the apparatus (e.g., a robotics AI engine) may obtain a first dataset for use in selecting pick points for a first set of objects. The apparatus may perform a first pick point selection process for the first set of objects. In certain configurations, The apparatus may perform the first pick point selection process by determining whether a pick point of an object can be selected using the first dataset and image information associated with the object, generating an updated first dataset upon determining that the pick point of the object can be selected using the first dataset and the image data associated with the object, and providing the image data associated with the object to at least one of a user device or a remote AI engine upon determining that the pick point of the object is unable to be selected using the first dataset and the image data. The apparatus may send the updated first dataset and an image dataset associated with objects in the first set of objects for which pick points are selected using the first dataset. The apparatus may receive, from the remote AI engine, a second dataset for use in selecting pick points for a second set of objects. In certain aspects, the second dataset may be different than the first dataset. In certain other aspects, the second data set may be received when the remote AI engine successfully selects the pick points for the portion of the first set of objects using the first dataset and the image dataset. The apparatus may perform a second pick point selection process for the second set of objects based at least in part on the second dataset.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A-5E are a diagram illustrating a data flow between devices within the example operating environment in accordance with certain aspects of the disclosure.

DETAILED DESCRIPTION

Figure 1:
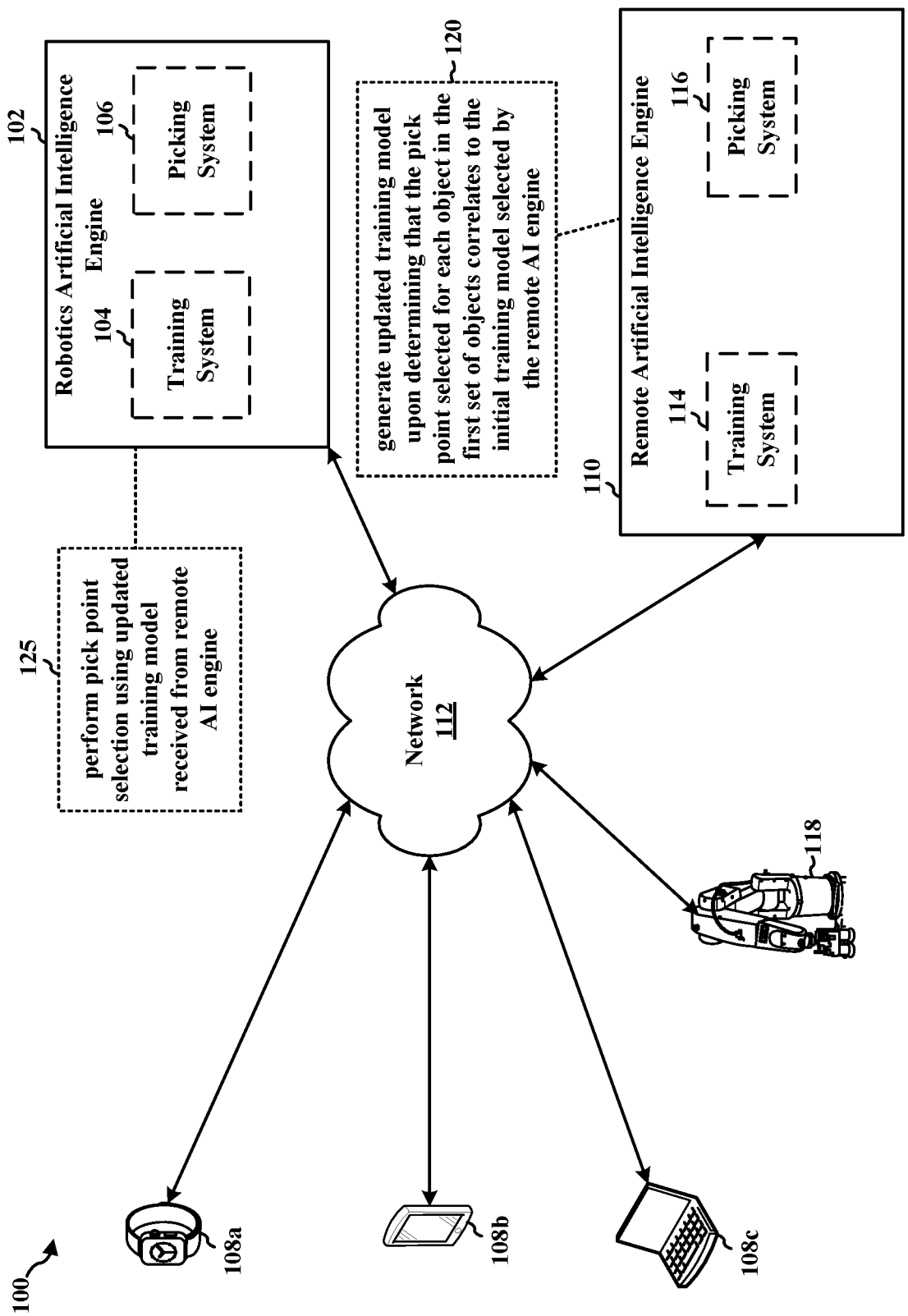
FIG. 1 is a diagram illustrating an example operating environment in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As mentioned above, there is a need for a pick point selection process that reduces the amount of human intervention required to select pick points within an industrial picking system as compared to conventional techniques.

The present disclosure provides a solution by enabling a remote AI engine to generate a dataset using an initial dataset generated by the robotics AI engine and a user dataset associated with pick points that are manually selected by a user. The dataset generated by the remote AI engine may enable the robotics AI engine to select pick points for objects the robotics AI engine would be unable to select without human intervention, e.g., as described below in connection with FIGS. 1-11.

Several aspects of industrial robotic picking systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example configurations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates a block diagram of an exemplary robotics picking environment 100 in accordance with certain aspects of the disclosure. As seen in FIG. 1, the exemplary operating environment 100 may include a robot or robotics AI engine 102, one or more user devices 108*a*, 108*b*, 108*c*, a remote AI engine 110, a network 112, and a robotics device 118. The robot or robotics AI engine 102, each of the user devices 108*a*, 108*b*, 108*c*, the remote AI engine 110, and the robot or robotics device 118 may be connected via a network 112. The network 112 may be capable of transporting messages between devices within the example operating environment 100. In certain configurations, one or more of the robot or robotics AI engine 102, the user device(s) 108*a*, 108*b*, 108*c*, or the remote AI engine 110 may send pick point selection information to the robot or robotics device 118 via the network 112. The robot or robotics device 118 may pick up an object based, at least in part, on the pick point selection information. Although three user devices 108*a*, 108*b*, 108*c* are illustrated in FIG. 1, more or fewer than three user devices may be included in the example operating environment 100 without departing from the scope of the present disclosure.

Each of the robot or robotics AI engine 102, the user device(s) 108*a*, 108*b*, 108*c*, remote AI engine 110, and the robot or robotics device 118 may include suitable logic, circuitry, interfaces, processors, and/or code that may be used for communications with the other devices within the example operating environment 100 via the network 112. For example, communications within the example operating environment 100 may be implemented using a wireless communication protocol (e.g., FlashLinQ, WiMedia, Bluetooth®, ZigBee®, Wi-Fi based on the IEEE 802.11 standard, Long-Term Evolution (LTE), or 5G New Radio (NR), narrowband internet-of-things (NB IoT), etc.), a mix of different wireless communication protocols, an internet protocol, a wired communication protocol, or any combination thereof. In certain configurations, the network 112 may comprise any one or combination of a wired network, a wireless wide area network (WWAN), a wireless local area network (WLAN), or a wireless personal area network (WPAN). In certain configurations, at least a portion of the network 112 may be private. In certain other configurations, at least a portion of the network 112 may be public, e.g., such as the Internet.

Referring to the robot or robotics AI engine 102, a training system 104 and a picking system 106 may be included therein. Each of the training system 104 and the picking system 106 may include at least one computing device, e.g., such as the computing device 200 described below in connection with FIG. 2. The training system 104 may maintain a dataset that may be used by the picking system 106 to select a pick point for an object that is to be picked up by the robotics device 118.

In one embodiment, the dataset refers to a training model, which would be familiar to a person of ordinary skill in the art, for generating an algorithm that predicts pick points for objects that may be depicted in an image associated with a pick request. A variety of different training models may be used, as would be known to persons of ordinary skill in the art without departing from the scope of the invention, including, but not limited to Markov Models, Random Walk Models, etc. In some embodiments, the dataset may include, for example, a lookup table that correlates different sets of pick point selection factors (e.g., height, position, angle, surface area, shape, volume, color, texture, shadows, obfuscation, etc.) with different pick points.

In one exemplary configuration, the picking system 106 may obtain image data (e.g., a 2-D or 3-D image) for a set of objects (e.g., one or more objects) located within a selection area that may be reached by the robotics device 118. The boundary of the image may include the entire selection area or a portion of the selection area. The image may be obtained using an imaging system (not shown) that includes one or more cameras. In certain configurations, the imaging system may be located within the picking system 106 or robot or robotics AI engine 102. In certain other configurations, the imaging system may be located externally from the robot or robotics AI engine 102. When externally located, the imaging system may send image data associated with object(s) within the selection area to the picking system 106 via the network 112.

In certain implementations, the picking system 106 may identify each object depicted in the image based on one or more identification factors (e.g., shape, edges, boundaries, color, texture, shadow, distance, etc.). Upon identifying each object depicted in the image, the picking system 106 may identify a set of pick point selection factors associated with each object by applying an algorithm developed based on the training model in the first dataset and/or the second dataset. For example, the picking system 106 may access the first dataset or second dataset maintained by the training system 104. The picking system 106 may find the object's identified set of pick point selection factor(s) maintained in the lookup table and/or in an algorithm that is generated from the training model in order to determine the corresponding pick point for the object.

In an example implementation, the training system 104 may maintain a first dataset (e.g., an initial training model) for cubic objects only. Here, the initial dataset may correlate a top surface area of x meters$^2$ (m$^2$) to a pick point of 2x inch$^2$ positioned around the center point of the top surface area of an object. Using this example, if the top surface area of object A is 4 meter$^2$, the picking system 106 may select and/or identify a pick point of 8 inch$^2$ around the center point of object A's top surface. A signal instructing the robot or robotics device 118 to pick up object A using an 8 inch$^2$ pick point centered around the center point of object A's top surface may be sent from the picking system 106. Additionally, a signal indicating the selected pick point along with image data associated with object A may be sent to the training system 104.

In certain configurations, the training system 104 may update the first dataset (e.g., generate a second dataset) to include information associated with the selected pick point and image data for object A. Additionally and/or alternatively, the robot or robotics device 118 may send a signal indicating whether object A was successfully picked up using the selected pick point to the training system 104. The training system 104 may generate the second dataset by including a datapoint that indicates whether the robot or robotics device 118 successfully picked up object A using the selected pick point. Additional details associated with the training system 104 and the picking system 106 are described below, e.g., in connection with FIGS. 3 and 4.

In instances when the picking system 106 is unable to select a pick point for an object (e.g., object B and/or object A'), the picking system 106 may send image data associated with object B to the user device(s) 108a, 108b, 108c and/or remote AI engine 110. For example, if the lookup table only includes pick points for cubic objects, and the picking system 106 identifies object B as spherical, a signal may be sent to the user device(s) 108a, 108b, 108c requesting that a user select a pick point for object B. Additionally and/or alternatively, the picking system 106 may send a signal to the remote AI engine 110 requesting the pick point be selected, if possible, by the picking system 116 at the remote AI engine 110.

Each of the user devices 108a, 108b, 108c may include at least one computing device, e.g., such as the computing device 200 described below in connection with FIG. 2. By way of example, a user device may include a cellular phone, a smart phone, a laptop, a personal computer (PC), a personal digital assistant (PDA), a multimedia device, a video device, a digital audio player (e.g., MP3 player), a camera, a game console, a tablet, a smart device, a wearable device, a vehicle, an IoT device, or any other similar functioning device. The robot or robotics AI engine 102 may send a request for user intervention to one or more user device(s) 108a, 108b, 108c upon determining that a pick point for an object is unable to be selected using the picking system 106. A signal indicating the user selected pick point and/or image data for that object may be sent from the user device 108a, 108b, 108c to one or more of the robot or robotics AI engine 102, the remote AI engine 110, or the robotics device 118.

The remote AI engine 110 may include a robot or robotics training system 114 and a picking system 116. Each of the robot or robotics training system 114 and the picking system 116 may include at least one computing device, e.g., such as the computing device 200 described below in connection with FIG. 2.

In certain aspects, the robot or robotics training system 114 may receive a dataset and/or corresponding image data corresponding to pick points selected by the robot or robotics AI engine 102. In certain other aspects, the robot or robotics training system 114 may receive the user dataset/corresponding image data related to pick points selected by a user on user device 108a, 108b, 108b. The user dataset/corresponding image data may be received from one or more of the robot or robotics AI engine 102 and/or the user device(s) 108a, 108b, 108c.

In one embodiment, the robot or robotics training system 114 may incorporate the received data to generate a new dataset that would enable the robotic picking system to pick objects that it may not have been able to without further intervention from a human operator and/or the remote AI engine 110.

In one embodiment, the picking system 116 may perform validation and/or accuracy testing to validate the accuracy of the new dataset that may be generated by remote AI engine 110 (and/or the training system 114). In one embodiment, the picking system 116 may perform an accuracy test prior to generating a new dataset and/or after generating a new dataset. In one embodiment, the accuracy test may be performed by comparing pick points that are generated the robot or robotics AI engine 102 and the remote AI engine 104 for the same object(s) by. In certain aspects, the picking system 116 may perform the accuracy test by selecting pick points for the objects that the robot or robotics AI engine 102 was able to select. The accuracy test may be performed by comparing the pick points selected by the remote AI engine 110 to the pick points selected by the robot or robotics AI engine 102. When the accuracy of the selected pick points meets a threshold (e.g., up to or more than 95%), the picking system 116 may send a signal to the robot or robotics training system 114 indicating that that the accuracy test was successful.

The robot or robotics training system 114 may generate a third dataset (e.g., pick points for both cubic objects and spherical objects) based at least in part on the second dataset and the user dataset when the accuracy test is successful (120), e.g., as described below in connection with any of FIGS. 2-11. As such, the new dataset (i.e. the third dataset) is typically at least as accurate as the first and/or the second dataset with respect to pick points that can be selected by either dataset; moreover, the third dataset is enabled to select pick points for objects that could not be selected by the first and/or the second dataset. The third dataset may be sent to the training system 104 of the robot or robotics AI engine 102.

In certain other aspects, the picking system 106 of the robot or robotics AI engine 102 may access the third dataset in order to perform a subsequent pick point selection process. Using the third dataset, the robot or robotics AI engine 102 may be able to select the pick points for a larger number of objects (e.g., both cubic objects and spherical objects), thereby reducing the number of times a user intervention is used during a pick point selection process (125), e.g., as described below in connection with any of FIGS. 2-11.

Figure 2:
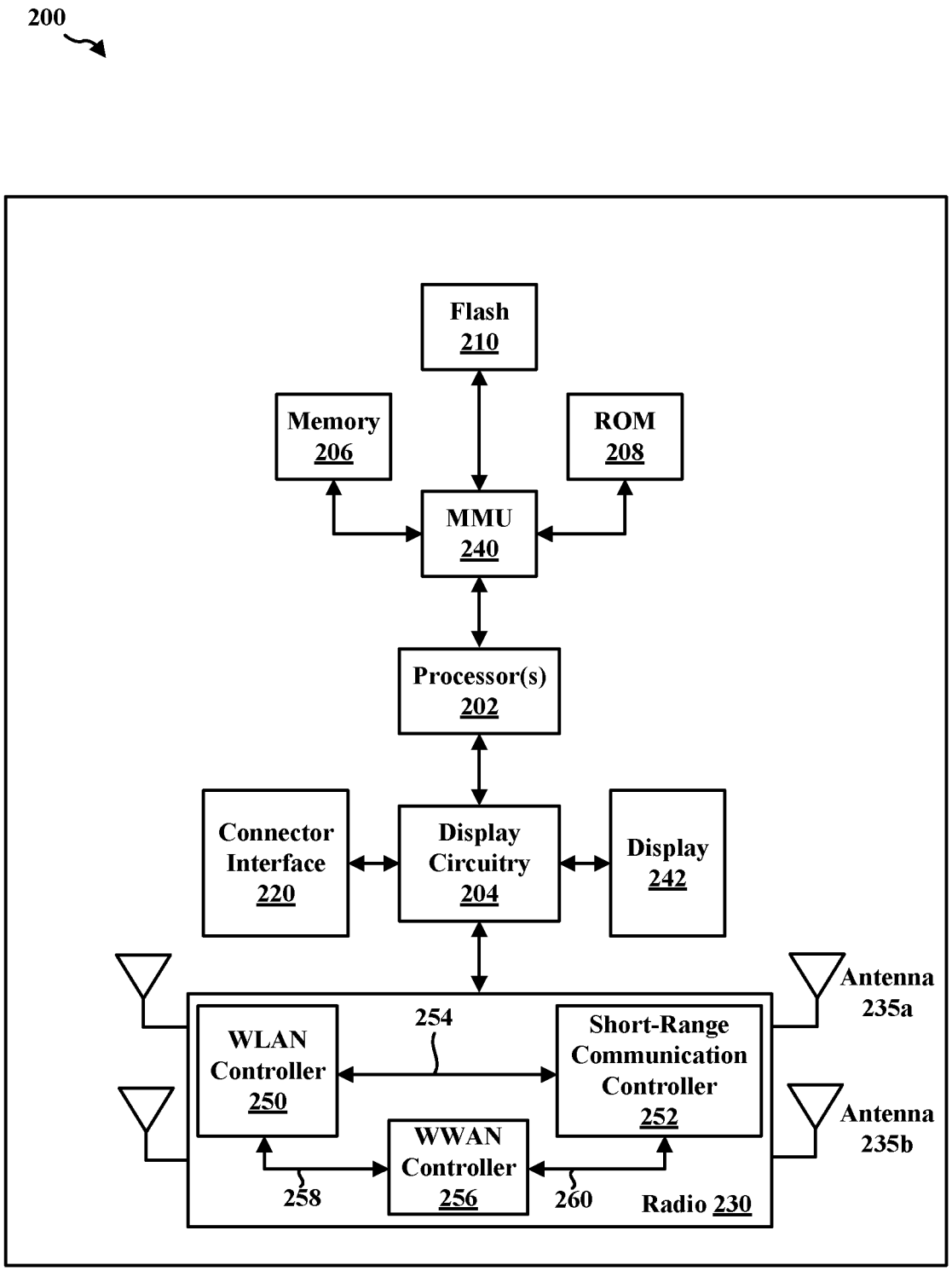
FIG. 2 is block diagram of a computing device in accordance with certain aspects of the disclosure.

FIG. 2 is block diagram of a computing device 200 in accordance with certain aspects of the disclosure. The computing device 200 may correspond to, e.g., the robot or robotics AI engine 102, the training system 104, the picking system 106, a user device 108a, 108b, 108c, the remote AI engine 110, the training system 114, the picking system 116, or the robotics device 118.

As shown in FIG. 2, the computing device 200 may include a processing element, such as processor(s) 202, which may execute program instructions for the computing device 200. The computing device 200 may also include display circuitry 204 which may perform graphics processing and provide display signals to the display 242. The processor(s) 202 may also be coupled to memory management unit (MMU) 240, which may be configured to receive addresses from the processor(s) 202 and translate the addresses to address locations in memory (e.g., memory 206, ROM 208, Flash memory 210) and/or to address locations in other circuits or devices, such as the display circuitry 204, radio 230, connector interface 220, and/or display 242. The MMU 240 may be configured to perform memory protection and page table translation or set up. In some configurations, the MMU 240 may be included as a portion of the processor(s) 202.

As shown, the processor(s) 202 may be coupled to various other circuits of the computing device 200. For example, the computing device 200 may include various types of memory, a connector interface 220 (e.g., for coupling to the computer system), the display 242, and wireless communication circuitry (e.g., for Wi-Fi, Bluetooth®, Bluetooth Low Energy®, cellular, etc.). The computing device 200 may include a plurality of antennas 235a, 235b, 235c, 235d, for performing wireless communication with, e.g., another device in the example operating system 100 described above in FIG. 1.

In certain aspects, the computing device 200 may include hardware and software components (a processing element) configured to generate and/or output information associated with a pick point associated with an object, e.g., using the techniques described below in connection with any FIGS. 3-11. In certain other aspects, the computing device 200 may include hardware and software components (a processing element) configured to generate and/or output a lookup table (e.g., dataset) that correlates pick point selection information with pick point(s), e.g., using the techniques described below in connection with any FIGS. 3-11.

The computing device 200 may be configured to implement part or all of the techniques described below in connection with any of FIGS. 3-11, e.g., by executing program instructions stored on a memory medium (e.g., a non-transitory computer-readable memory medium) and/or through hardware or firmware operation. In other configurations, the techniques described below in connection with any of FIGS. 3-11 may be at least partially implemented by a programmable hardware element, such as a field programmable gate array (FPGA), and/or an application specific integrated circuit (ASIC).

In certain aspects, radio 230 may include separate controllers configured to control communications for various respective radio access technology (RAT) protocols. For example, as shown in FIG. 2, radio 230 may include a WLAN controller 250 configured to control WLAN communications, a short-range communication controller 252 configured to control short-range communications, and a WWAN controller 256 configured to control WWAN communications. In certain aspects, the computing device 200 may store and execute a WLAN software driver for controlling WLAN operations performed by the WLAN controller 250, a short-range communication software driver for controlling short-range communication operations performed by the short-range communication controller 252, and/or a WWAN software driver for controlling WWAN operations performed by the WWAN controller 256.

In certain implementations, a first coexistence interface 254 (e.g., a wired interface) may be used for sending information between the WLAN controller 250 and the short-range communication controller 252. In certain other implementations, a second coexistence interface 258 may be used for sending information between the WLAN controller 250 and the WWAN controller 256. In certain other implementations, a third coexistence interface 260 may be used for sending information between the short-range communication controller 252 and the WWAN controller 256.

In some aspects, one or more of the WLAN controller 250, the short-range communication controller 252, and/or the WWAN controller 256 may be implemented as hardware, software, firmware or some combination thereof.

In certain configurations, the WLAN controller 250 may be configured to communicate with another device in a network (e.g., example operating network 100) using a WLAN link using all of the antennas 235a, 235b, 235c, 235d. In certain other configurations, the short-range communication controller 252 may be configured to communicate with another device in a network (e.g., example operating network 100) using one or more of the antennas 235a, 235b, 235c, 235d. In certain other configurations, the WWAN controller 256 may be configured to communicate with another device in a network (e.g., example operating network 100) using all of the antennas 235a, 235b, 235c, 235d.

Figure 3:
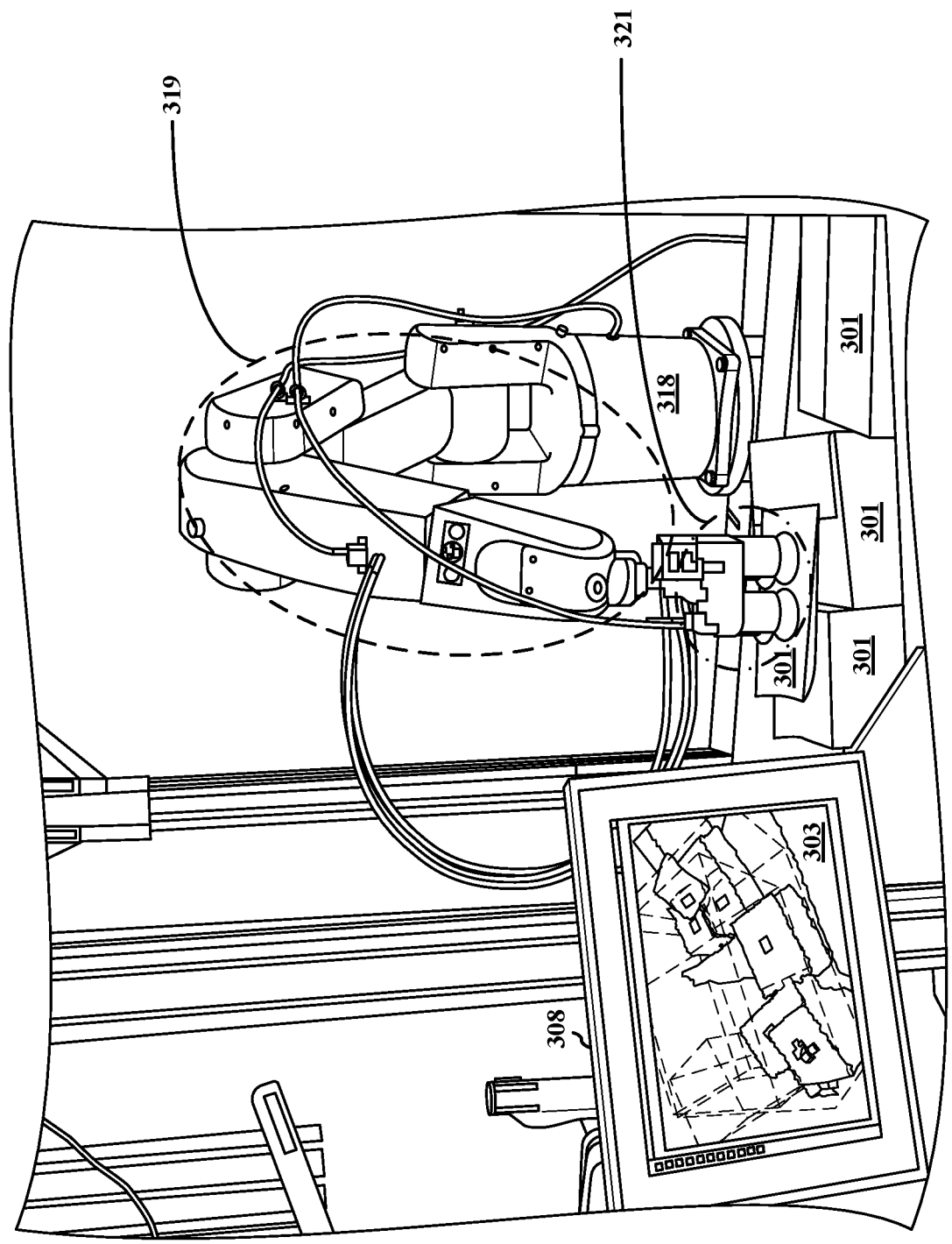
FIG. 3 is a diagram illustrating an example robotics picking system in accordance with certain aspects of the disclosure.

FIG. 3 illustrates an exemplary industrial robotic picking system 300 in accordance with certain aspects of the disclosure. The industrial robotic picking system 300 may illustrate a more detailed partial view of, e.g., the operating system 100 described above in connection with FIG. 1. As seen in FIG. 3, industrial picking system 300 includes a set of objects 301 located within a selection area that is accessible to a robot or robotics device 318. The industrial picking system 300 may also include a user device 308 that displays and image 306 (e.g., 2-D image, 3-D image, etc.) of set of objects 301 located within the selection area. The user device 308 may correspond to, e.g., user device 108a, 108b, 108c, 508, 755, 1055, the computing device 200. The robot or robotics device 318 may correspond to, e.g., the robotics device 118, 518, 750, the computing device 200.

In certain aspects, the user device 308 and the robot or robotics device 318 may communicate with one another. Although not illustrated in FIG. 3, the user device 308 and the robot or robotics device 318 may each communicate with a robotics AI engine (e.g., robot or robotics AI engine 102, 502, 1050, the computing device 200, the apparatus 702/702') and/or a remote AI engine (e.g., remote AI engine 310, 510, 760, the computing device 200, the apparatus 1002/1002').

Referring to FIG. 3, the user device 308 may display an image 306 of objects 301 located within a selection area of the robot or robotics device 318. In certain configurations, the image 306 may be displayed when a robotics AI engine (not shown) and/or remote AI engine (not shown) is unable to select a pick point for one or more of the objects 301 in the selection area. In certain other configurations, an image 306 of the objects 301 located in the selection area may be displayed continuously.

In certain configurations, the user device 308 may include a touch screen which enables a user to select a pick point for one or more of the objects 301 by touch or gesture. In certain other configurations, the user device 308 may enable a user to select a pick point for one or more of the objects using a cursor position to indicate the pick point. Selection information associated with the pick point may be sent to one or more of the robotics AI engine (not shown), the remote AI engine (not shown), or the robot or robotics device 318.

The robot or robotics device 318 may be a 6-axis robot. In other embodiments, the robot or robotic device 318 may have a greater or lesser number of axes or degrees of freedom. The various components of the robot or robotic device 318 may be connected via joints.

In one embodiment, the robot or robot or robotics device 318 may be comprised of an moveable components 319 with an end effector (herein also referred to as a picking apparatus) 321 attached thereto. The one or more moveable components 319 may include any number of robotic components that may be used to position the picking apparatus 321 with respect to an object 301 such that the end effector 321 may picks up the object 301 by navigating to a selected pick point. The robot or robotics device 318 may receive information associated with an object's 301 pick point from one or more of a robotics AI engine (not shown), remote AI engine (not shown), or user device 308. The end effector 321 may include any apparatus known in the art that may be used to pick up an object. For example, the end effector 321 may be a gripper. In other forms, the end effector may be comprised of a vacuum gripper having a plurality of vacuum powered suction cups configured to pick up objects from a pick station and/or a reachable area. In one form, the suction cups may be arranged in a 2×2 grid, 3×3 grid, and/or other geometric orientations. The number of suction cups may vary with the needs of the application. In other embodiments, other forms of grippers or other types of end effectors may be employed. In one embodiment, the suction cups may form an XY plane of end effector and/or XYZ plane of end effectors.

Although shown with a single set of suction cups, the picking apparatus 321 may include different sets of suction cups of different sizes and/or orientations. For example, the picking apparatus 321 may include a first set of suction cups of a first size and a second set of suction cups of a second size. In certain implementations, the first set of suction cups may be used to pick up an object 301 of a first size (e.g., a top surface of less than 1 meter) and/or a first weight (e.g., less than 5 pounds). The second set of suction cups may be larger in size or number than the first set of suctions cups, and hence, the second set of suction cups may be used to pick up an object 301 of a larger size and/or heavier weight (e.g., a top surface of more than 1 meter$^2$ or second weight (e.g., more than 5 pounds) as compared to those objects picked up using the first set of suction cups.

A picking apparatus 321 that includes multiple sets of suction cups, as in the example described above, may be beneficial because a larger variety and/or number of objects (e.g., different sizes, shapes, weights, material, etc.) may be moveable within an industrial picking system as compared to an industrial picking system that employs a robotics device that includes a single picking apparatus.

In one embodiment, the end effectors 321 may be configured to navigate to a selected pick point of an object 301, collect the item, navigate to a destination point, and release the object.

Figure 4:
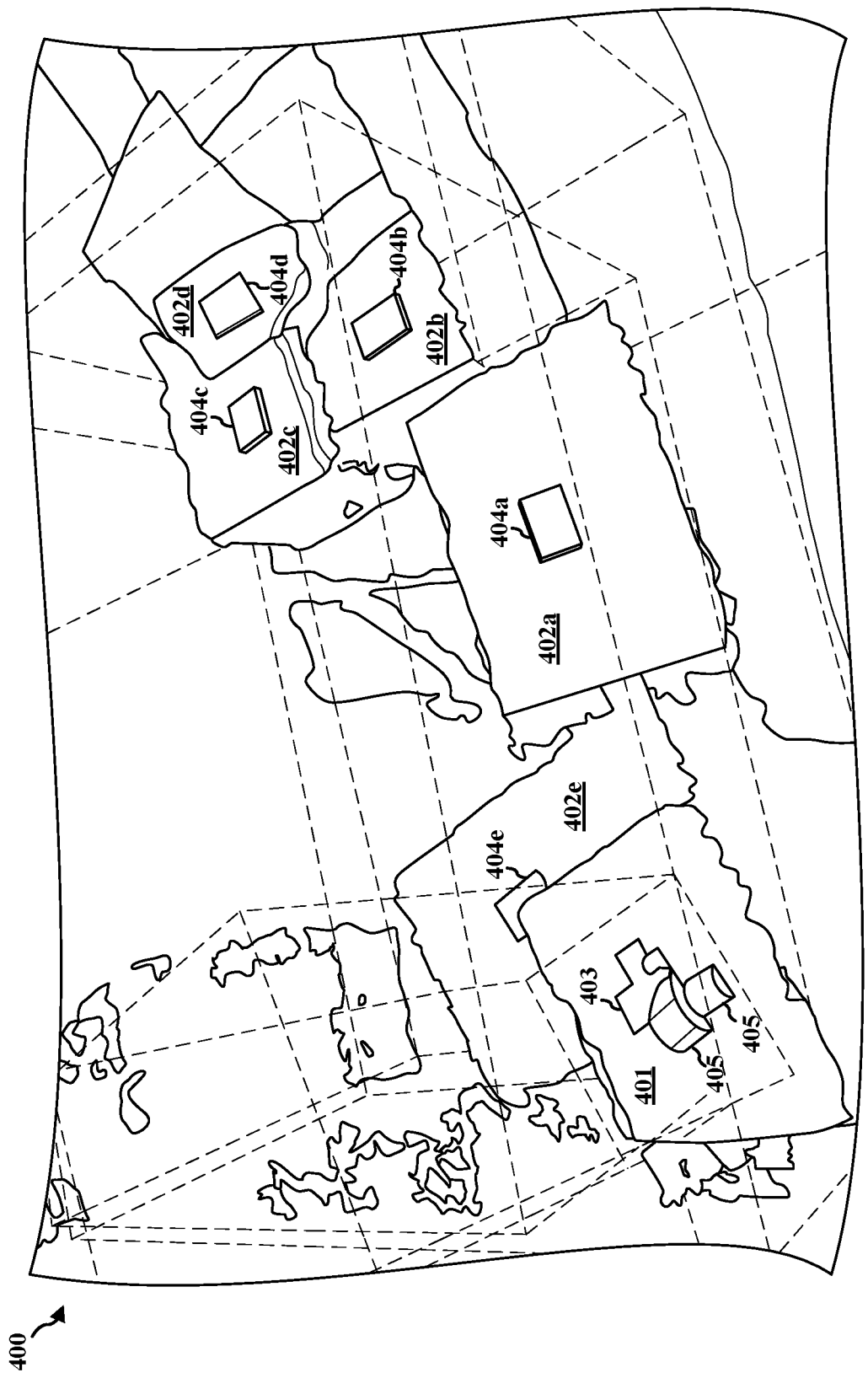
FIG. 4 is a diagram illustrating a detailed view of the example three-dimensional (3-D) image of objects and pick points within a robotics picking system in accordance with certain aspects of the disclosure.

FIG. 4 illustrates an example image 400 of a set of objects within a selection area accessible by a robotics device in accordance with certain aspects of the disclosure. Although the image 400 illustrated in FIG. 4 depicts six objects 401, 402a, 402b, 402c, 402d, 402e within the selection area, more or fewer than six objects may be depicted without departing from the scope of the present disclosure.

In the example illustrated in FIG. 4, one or more of a robotics AI engine (not shown) or a remote AI engine (not shown) may select a respective pick point 404a, 404b, 404c, 404d, 404e for each of objects 402a, 402b, 402c, 402d. However, because debris 405 obscures a portion of the top surface of object 401, the robotics AI engine and/or remote AI engine may be unable to select a pick point 403 for object 401. In other words, the dataset used by the robotics AI engine and/or remote AI engine may omit information related to selecting a pick point for an object covered with debris.

In such instances, the robotics AI engine and/or remote AI engine may request that a user select a pick point for object 401 using a user device. The request may include a text-based request, an audible alert, a voice-based request, or any combination thereof.

In certain implementations, object 401 may be highlighted or otherwise indicated within the image 400 so that the user may easily identify the object 401 for which pick point selection is requested. The user's selected pick point for object 401 may be sent to one or more of the robotics AI engine, the remote AI engine, and/or the robotics device.

FIGS. 5A-5E illustrate a data flow 500 for consolidating datasets in an industrial picking system that includes a robotics AI engine 502, a user device 508, a remote AI engine 510, and a robotics device 518 in accordance with certain aspects of the disclosure. The robotics AI engine 502 may correspond to, e.g., robot or robotics AI engine 102, 1050, computing device 200, the apparatus 702/702'. The user device 508 may correspond to, e.g., the user device 108a, 108b, 108c, 308, 755, 1055, the computing device 200. The remote AI engine 510 may correspond to, e.g., the remote AI engine 110, 760, the computing device 200, the apparatus 1002/1002'. The robotics device 518 may correspond to, e.g., the robotics device 118, 318, 750, the computing device 200.

Operations set forth in FIGS. 5A-5E may be described below using an example implementation in which the first set of objects includes a plurality of boxes and the second set of objects include a plurality of spheres. However, it should be understood that the first set of objects and the second set of objects may include any type of object that may be picked up using a robot without departing from the scope of the present application. Optional operations in FIGS. 5A-5E may be indicated with dashed lines.

Figure 5A:
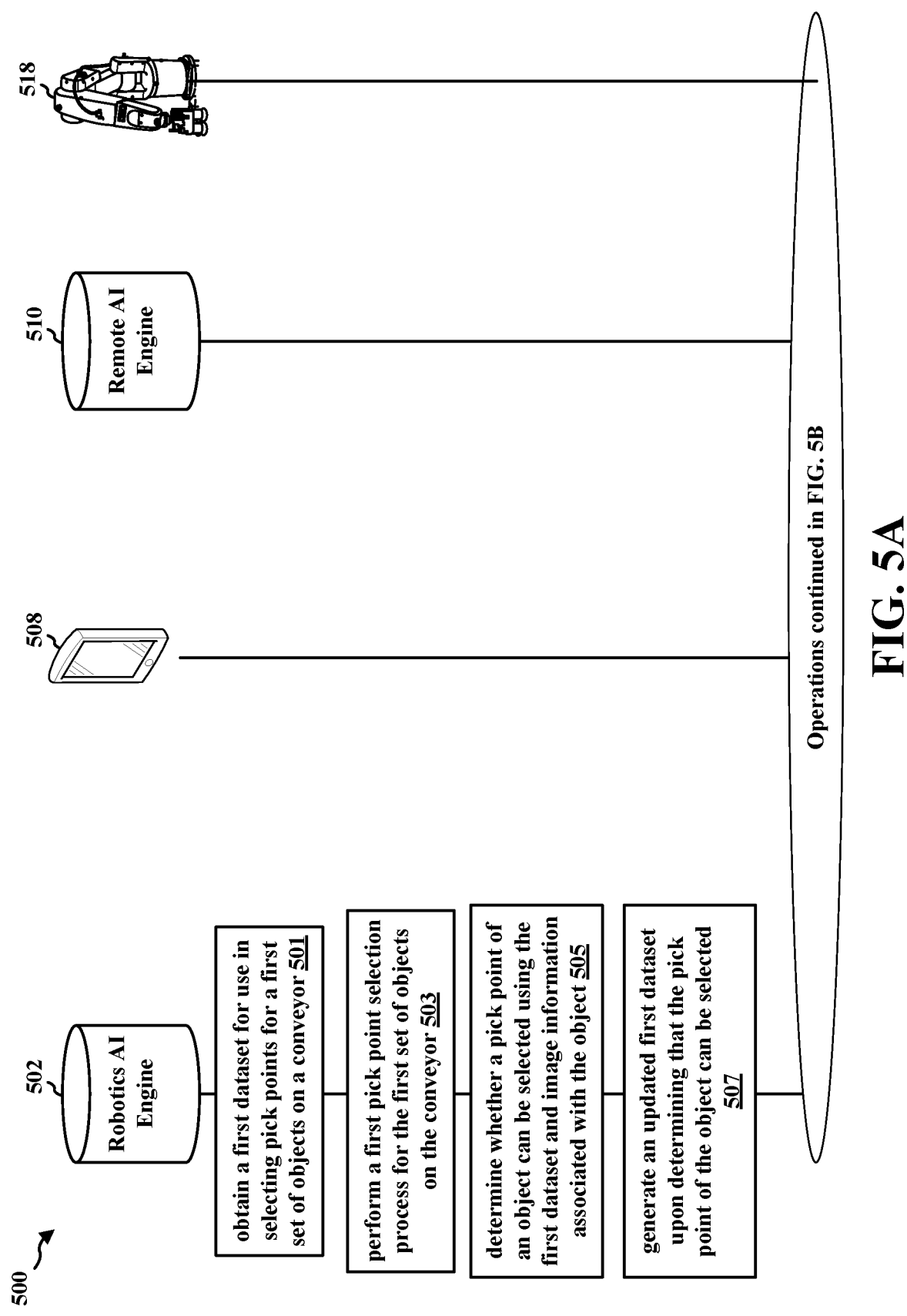
Figure 5C:
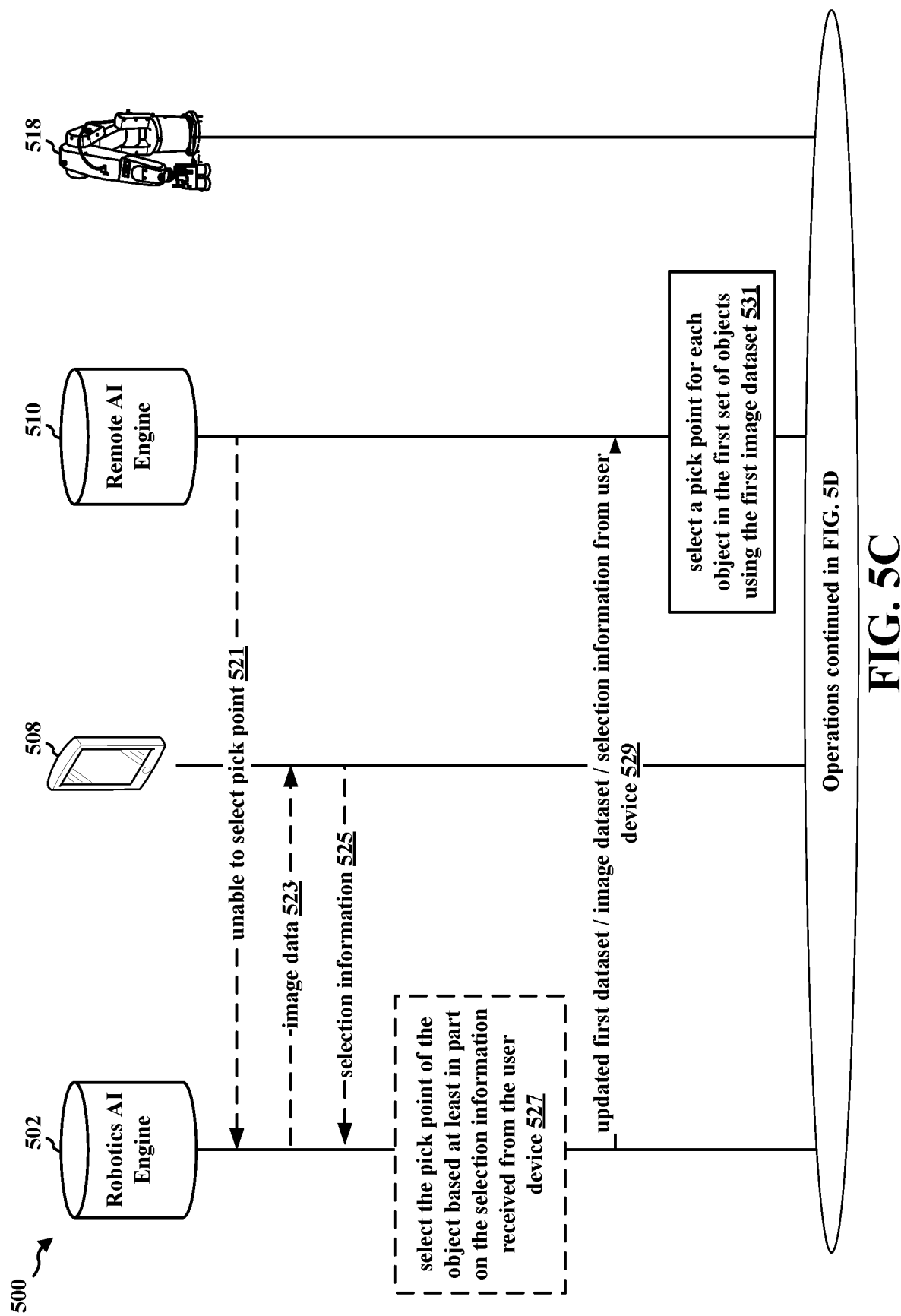
Figure 5D:
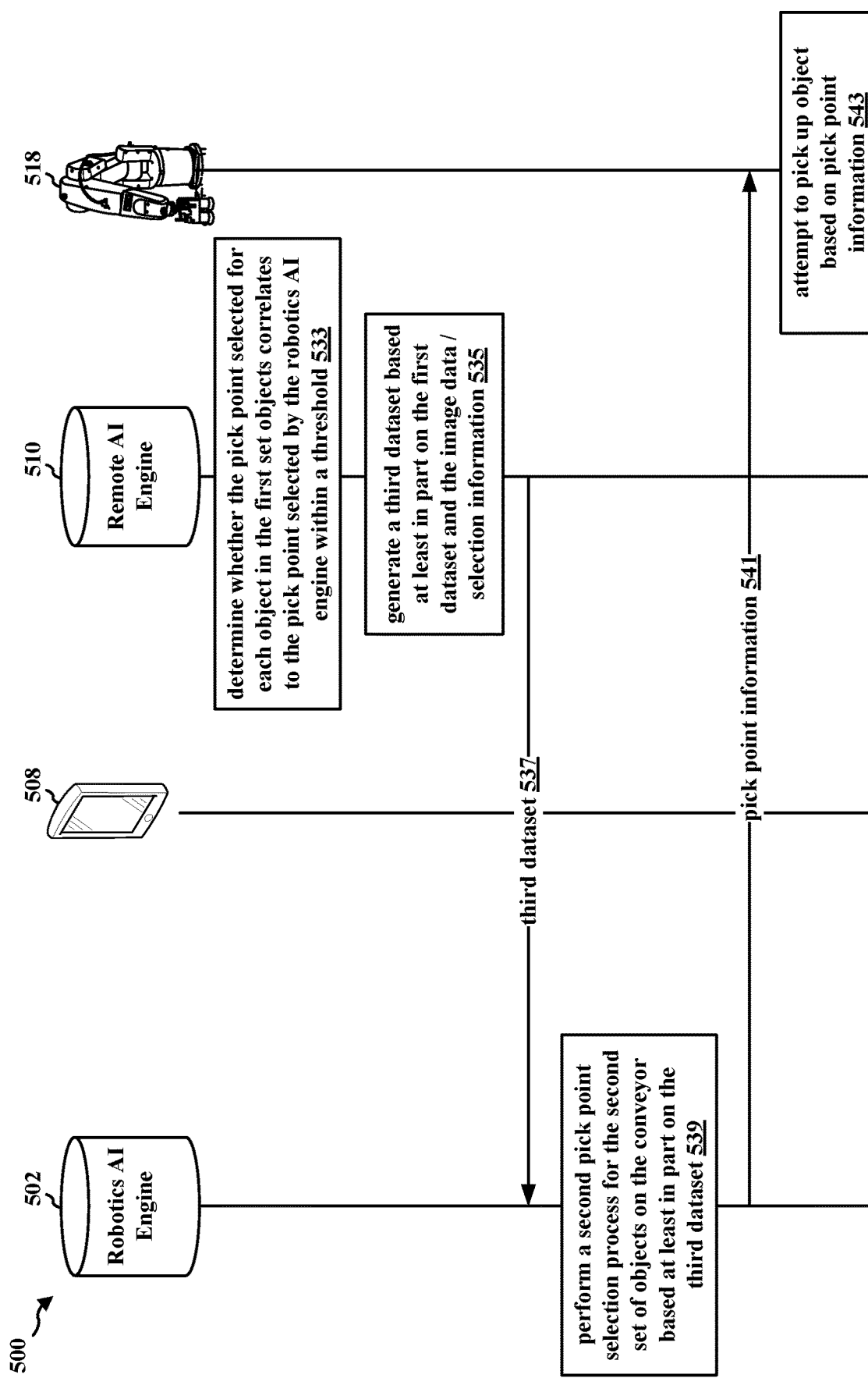
Figure 5E:
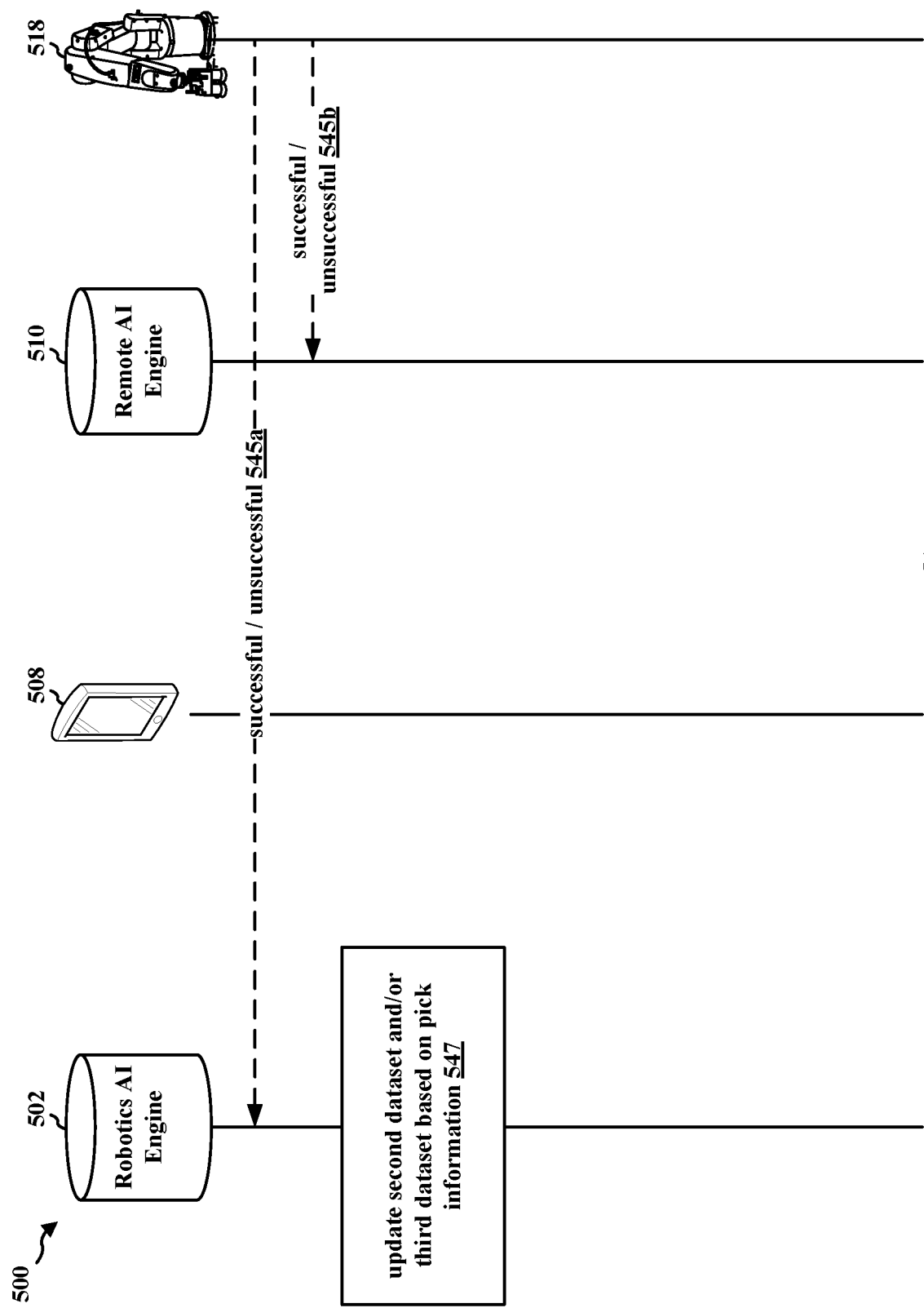

Referring to FIG. 5A, the robotics AI engine 502 may obtain (at 501) a first dataset for use in selecting pick points for a first set of objects (e.g., boxes). By way of example, the first dataset may include a look up table that correlates different combinations of pick point selection factors to different possible pick points on a box. The first dataset my omit information related pick points on a sphere, and hence, the robotics AI engine 502 may select pick points for boxes using the first dataset but not for spheres.

In certain implementations, the robotics AI engine 502 may perform (at 503) a first pick point selection process for the first set of objects (e.g., one or more boxes). In certain aspects, the first pick point selection process may be performed by, e.g., determining (at 505) whether a pick point of an object (e.g., either a box or a sphere) may be selected using the first dataset (e.g., the look up table that correlates different combinations of pick point selection factors to pick points on a box and/or an AI model) and image information (e.g., 2-D image, 3-D image, video, etc. in incoming requests) associated with the object (e.g., either a box or a sphere).

In certain other aspects, the first pick point selection process may be performed by, e.g., updating (at 507) the first dataset upon determining that the pick point of the object (e.g., box) may be selected using the first dataset (e.g., look up table that correlates pick point selection factors to pick points on a box) and the image data (e.g., 2-D image, 3-D image, video data, etc.) associated with the object (e.g., a box). In certain configurations, the robotics AI engine 502 may update the first dataset by adding a datapoint that correlates a pick point for a box with a particular combination of pick point selection factors. Furthermore, the robotics AI engine 502 may maintain an image dataset that include image data associated with each object for which a pick point is selected using the first dataset.

In certain other aspects, the first pick point selection process may be performed by, e.g., providing (at 509 or at 515) the image data (e.g., 2-D image, 3-D image, video data, etc.) associated with the object (e.g., a sphere) to at least one of the user device 508 or the remote AI engine 510 upon determining that the pick point of the object (e.g., a sphere) may not be selected using the first dataset (e.g., look up table for pick points on a box) and the image data (e.g., 2-D image, 3-D image, video, etc.).

In configurations in which the image data is provided (at 509) to the user device 508, the robotics AI engine 502 and/or remote AI engine 510 may receive (at 511a) selection information associated with the pick point of the object (e.g., sphere) from the user device 508. In certain aspects, the selection information may indicate a location, a position, an area, or a region on the sphere selected by the user. In certain configurations, the remote AI engine 510 may generate (at 511b) a second dataset (e.g., new dataset or a new training model) by updating a first dataset (e.g., the same initial dataset maintained by the robotics AI engine 502) by adding the user selected pick points to the first dataset. The robotics AI engine 502 may determine (at 513) the pick point as the location, position, area, and/or region on the object (e.g., sphere) selected by the user.

In configurations in which the image data is provided (at 515) to the remote AI engine 510, the remote AI engine 510 may use the image data to determine (at 517) whether a pick point may be selected for the object (e.g., sphere) using a dataset accessible to the remote AI engine 510. The pick point may be selected by the remote AI engine 510 using the new dataset that is generated (at 511b) by updating the initial dataset with the user selected pick point.

Upon determining (at 517) that a pick point (e.g., of a sphere) may be selected by a robot, the remote AI engine 510 may provide (at 519a) selection information associated with the pick point to the robotics AI engine 502 and/or the robotics device 518. The robotics AI engine 502 may use the selection information to determine (at 521) the pick point on the object (e.g., sphere). In certain aspects, the selection information may indicate the pick point as a location, a position, an area, or a region on the object (e.g., sphere).

Upon determining (at 517) that a pick point (e.g., of a sphere) may not be selected, the remote AI engine 510 may indicate (at 519b) that the pick point (e.g., of the sphere) cannot be determined. The robotics AI engine 502 may provide (at 523) the image data associated with the object to the user device 508 when the remote AI engine 510 is unable to select the pick point. The robotics AI engine 502 may receive (at 525) selection information from the user device 508. Using the selection information, the robotics AI engine 502 may determine (at 527) the pick point on the object (e.g., sphere).

The robotics AI engine 502 may provide (at 529) one or more of the updated first dataset, the image dataset associated with the updated first dataset, or a user dataset that includes selection information received from the user device 508. In certain configurations, the robotics AI engine 502 may provide (at 529) the information to the remote AI engine 510 continuously, periodically, or in batches.

The remote AI engine 510 generate a second dataset based at least in part on the updated first dataset and the user dataset. In certain implementations, the second dataset may include a look up table that correlates combinations of cubic pick point selection factors with pick points and combinations of spherical pick point selection factors with pick points. The robotics AI engine 502 may perform (at 539) a subsequent pick point selection process using the second dataset. The second dataset may enable the selection of pick points for both boxes and spheres by the robotics AI engine 502, which may reduce the number of pick points that require user selection. Prior to generating the second dataset, an accuracy test may be performed (at 531, 533) using the updated first dataset and the image dataset in order to validate the accuracy of the remote AI engine 510. In performing the accuracy test, the remote AI engine 510 may select (at 531) a pick point for each object in the first set of objects (e.g., the boxes with pick points selected by the robotics AI engine 502) using the first image dataset (e.g., images of the boxes with pick points selected by the robotics AI engine 502).

The remote AI engine 510 may determine (at 533) whether the number of correctly selected pick points using the accuracy test meet a threshold. For example, the remote AI engine 510 may compare its selected pick points to those selected by the robotics AI engine 502. When the number of correctly selected pick points meets the threshold (e.g., up to or more than 95%), the remote AI engine 510 may generate (at 535) a second dataset that includes a correlation for combinations of cubic pick point selection factors with pick points and combinations of spherical pick point selection factors with pick points. The second dataset may be sent (at 537) to the robotics AI engine 502 for use in performing (at 539) a second pick point selection process that enables the selection of pick points for both boxes and spheres without requesting user intervention.

The robotics AI engine 502 may send (at 541) pick point information for an object (e.g., a box or a sphere) to the robotics device 518. The robotics device 510 may orient its moveable arm and/or picking apparatus with respect to the object. The robotics device 518 may attempt (at 543) to attach to the object at the indicated pick point. The robotics device 510 may indicate (at 545a, 545b) whether the object (e.g., box or sphere) was picked up using the pick point indicated by the robotics AI engine 502. In certain implementations, the robotics AI engine 502 and/or the remote AI engine 510 may update (at 547, 549) the first dataset and/or second dataset to indicate which selected pick points were successful and which were unsuccessful.

Using the techniques described above, the industrial picking system of the present disclosure may reduce the number of times user intervention is required for pick point selection by generating a new dataset that includes the initial dataset updated by the robotics AI engine and a user dataset that includes user selected pick points.

FIGS. 6A-6D are a flowchart 600 of a method of consolidating datasets in an AI picking system in accordance with certain aspects of the disclosure. The method may be performed by a robotics AI engine, e.g., robot or robotics AI engine 102, 302, 502, 1050, computing device 200, the apparatus 702/702'. In FIGS. 6A-6D, optional operations may be indicated with dashed lines.

Figure 6A:
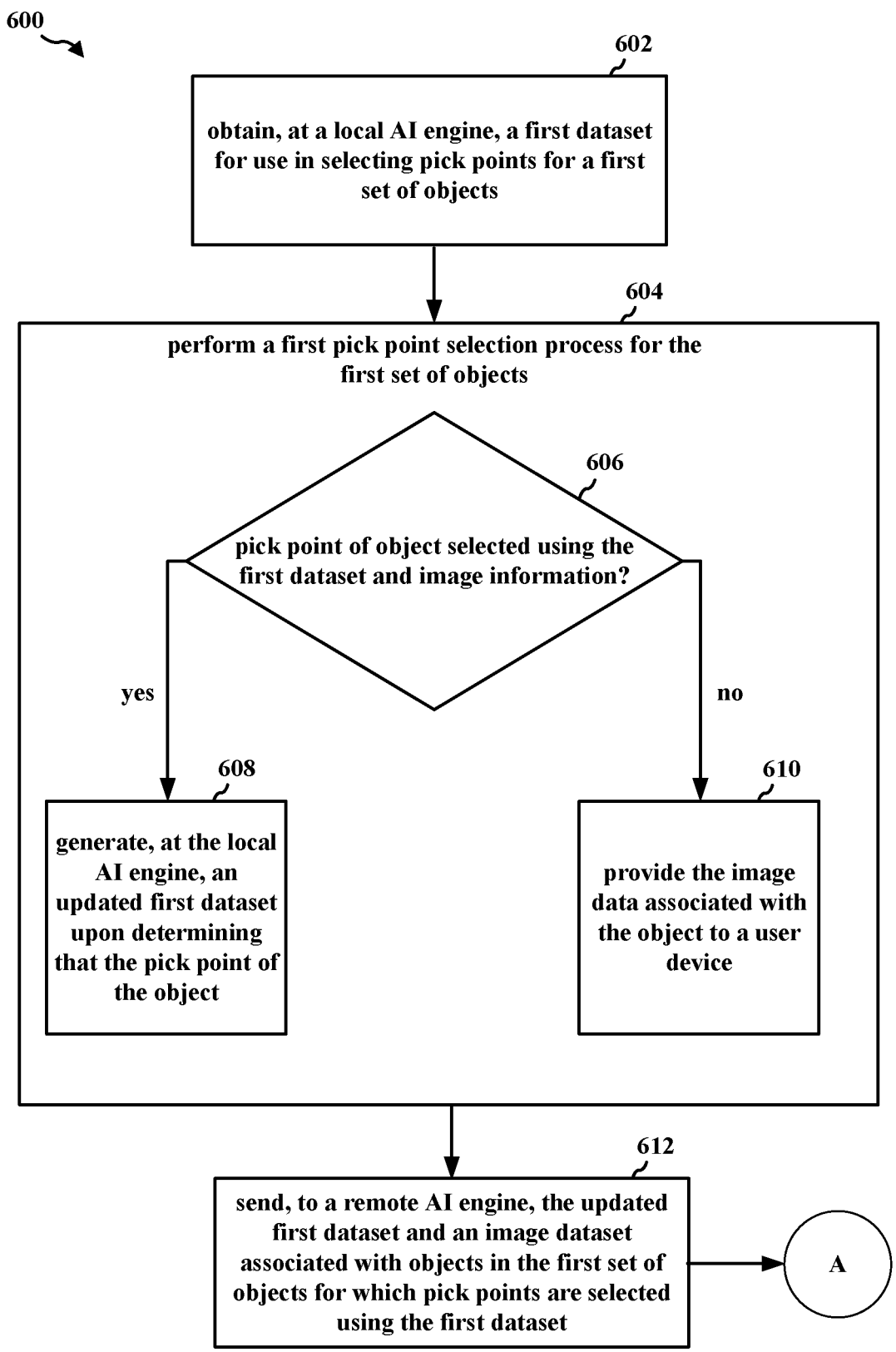
FIGS. 6A-6D are a flowchart of a method of consolidating datasets in a robotics picking system in accordance with certain aspects of the disclosure.

Referring to FIG. 6A, at 602, the robotics AI engine obtain a first dataset for use in selecting pick points for a first set of objects. For example, referring to FIG. 5A, the robotics AI engine 502 may obtain (at 501) a first dataset for use in selecting pick points for a first set of objects (e.g., boxes). By way of example, the first dataset may include a look up table that correlates pick point selection factors to various possible pick points on a box. The first dataset my omit a correlation of pick point selection factors associated to pick points on a sphere, and hence, the robotics AI engine 502 may be able to select pick points for boxes using the first dataset but not for spheres.

At 604, the robotics AI engine may perform a first pick point selection process for the first set of objects. For example, referring to FIG. 5A, the robotics AI engine 502 may perform (at 503) a first pick point selection process for the first set of objects (e.g., one or more boxes).

In certain configurations, at 606, the robotics AI engine may perform the first pick point selection process by determining whether a pick point of an object can be selected using the first dataset and image information associated with the object. For example, referring to FIG. 5A, the first pick point selection process may be performed by, e.g., determining (at 505) whether a pick point of an object (e.g., either a box or a sphere) may be selected using the first dataset (e.g., the look up table that correlates pick points to pick point selection factors associated with boxes) and image information (e.g., 2-D image, 3-D image, video data, etc.) associated with the object (e.g., either a box or a sphere).

Upon determining that pick point of the object can be selected using the first dataset and image information associated with the object, at 608, the remote AI engine may generate an updated first dataset. For example, referring to FIG. 5A, the first pick point selection process may be performed by, e.g., updating (at 507) the first dataset upon determining that the pick point of the object (e.g., box) may be selected using the first dataset (e.g., look up table that correlates pick point selection factors to pick points on a box) and the image data (e.g., 2-D image, 3-D image, video data, etc.) associated with the object (e.g., a box). In certain configurations, the robotics AI engine 502 may update the first dataset by adding a datapoint that correlates the selected pick point for a specific box to the pick point selection factors associated with that box.

Otherwise, upon determining that pick point of the object is unable to be selected using the first dataset and image information associated with the object, at 610, the remote AI engine may provide the image data associated with the object to at least one of a user device or a remote AI engine. For example, referring to FIG. 5A, the first pick point selection process may be performed by, e.g., providing (at 509 or at 515) the image data (e.g., 2-D image, 3-D image, video data, etc.) associated with the object (e.g., a sphere) to at least one of the user device 508 or the remote AI engine 510 upon determining that the pick point of the object (e.g., a sphere) may not be selected using the first dataset (e.g., look up table that correlates pick point selection factors associated with boxes to pick points on a box) and the image data (e.g., 2-D image, 3-D image, video data, etc.).

At 612, the remote AI engine may send, to a remote AI engine, the updated first dataset and an image dataset associated with objects in the first set of objects for which pick points are selected using the first dataset. For example, referring to FIG. 5C, the robotics AI engine 502 may provide (at 529) one or more of the updated first dataset generated (at 507), the image dataset associated with the updated first dataset, or a user dataset that includes selection information received from the user device 508. In certain configurations, the robotics AI engine 502 may provide (at 529) the information to the remote AI engine 510 continuously, periodically, or in batches.

Figure 6B:
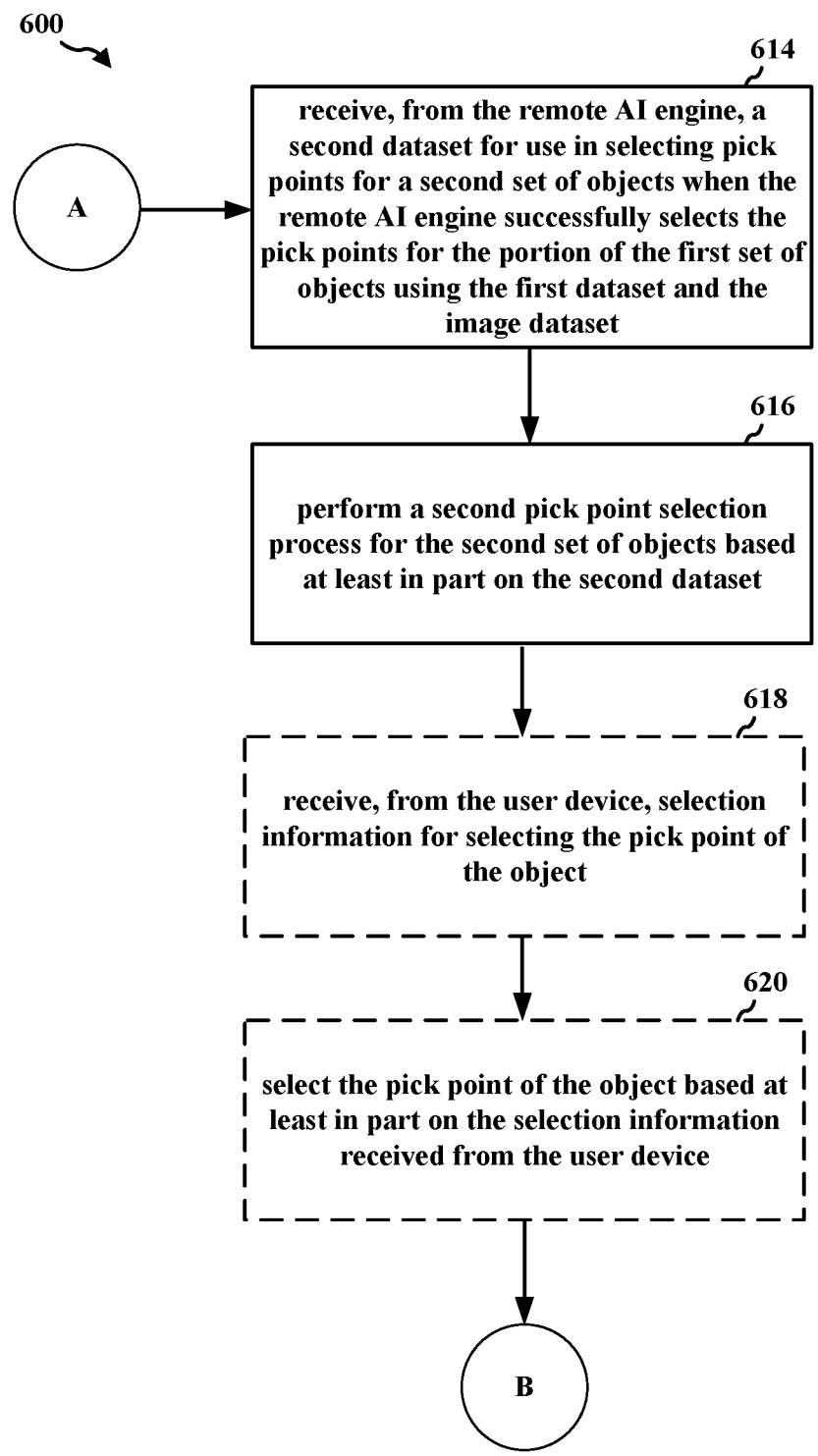

Referring to FIG. 6B, at 614, the robotics AI engine may receive a second dataset for use in selecting pick points for a second set of objects. In certain aspects, the second dataset may be different than the first dataset, and the second data set may be received when the remote AI engine successfully selects the pick points for the portion of the first set of objects using the first dataset and the image dataset. For example, referring to FIG. 5D, the second dataset may be sent (at 537) to the robotics AI engine 502 for use in performing (at 539) a second pick point selection process for a larger variety of objects, e.g., for selecting pick points for both boxes and spheres without requesting user intervention.

At 616, the robotics AI engine may perform a second pick point selection process for the second set of objects based at least in part on the second dataset. For example, referring to FIG. 5D, the second dataset may be sent (at 537) to the robotics AI engine 502 for use in performing (at 539) a second pick point selection process for a larger variety of objects, e.g., for selecting pick points for both boxes and spheres without requesting user intervention.

At 618, the robotics AI engine may receive, from the user device, selection information for selecting the pick point of the object. For example, referring to FIG. 5B, the robotics AI engine 502 may receive (at 511a) selection information associated with the pick point of the object (e.g., sphere) from the user device 508. In certain aspects, the selection information may indicate a location, a position, an area, or a region of the sphere which the user selects for use by the robotic device 518 in moving the object.

At 620, the robotics AI engine may determine the pick point of the object based at least in part on the selection information received from the user device. For example, FIG. 5B, the robotics AI engine 502 may determine (at 513) the pick point of the object (e.g., sphere) that correlates to the user selected location, position, area, and/or region indicated in the selection information based at least in part on the image data.

Figure 6C:
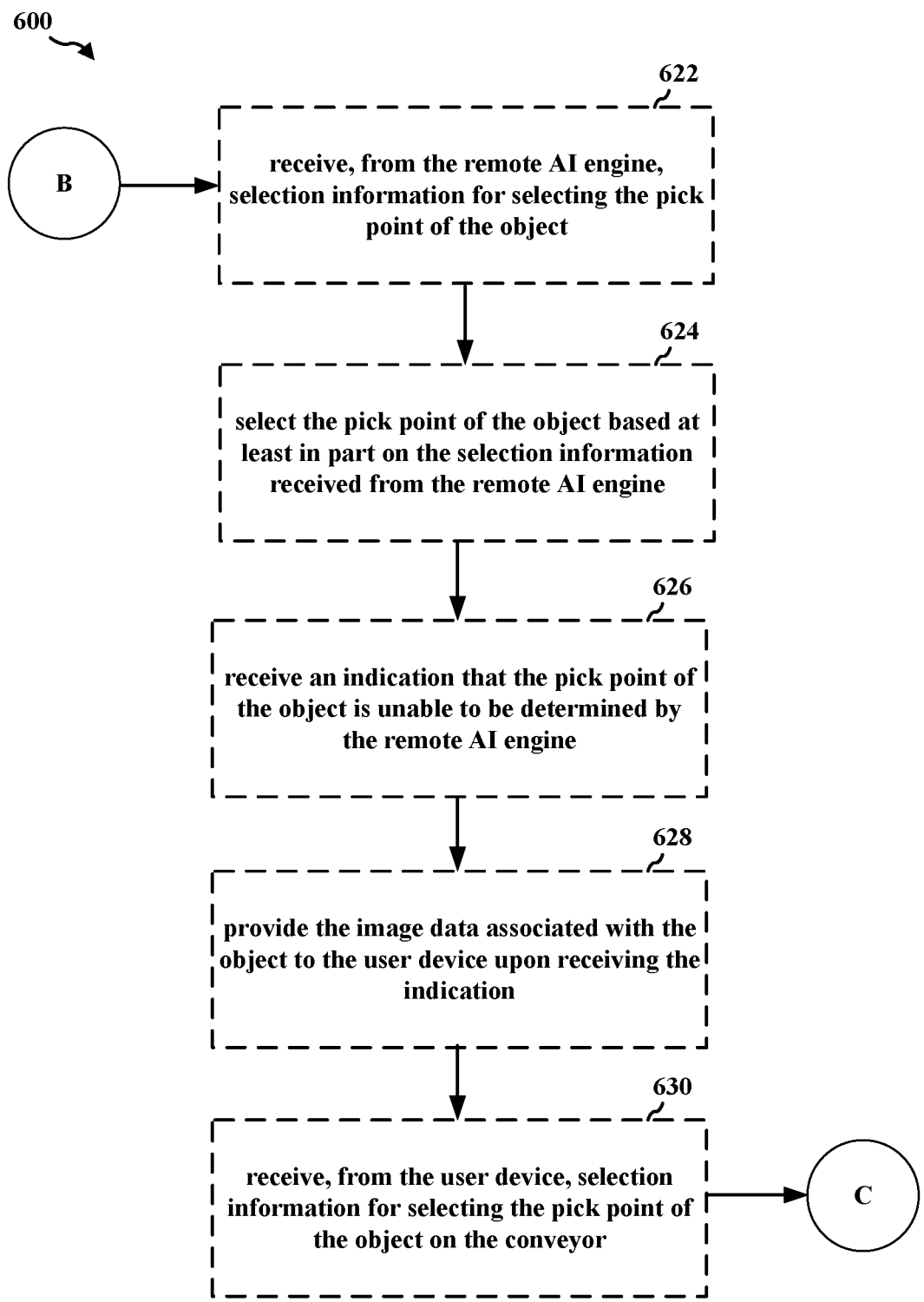

Referring to FIG. 6C, at 622, the robotics AI engine may receive, from the remote AI engine, selection information for selecting the pick point of the object. For example, referring to FIG. 5B, the remote AI engine 510 may provide (at 519a) selection information associated with the pick point to the robotics AI engine 502.

At 624, the robotics AI engine may determine the pick point of the object based at least in part on the selection information received from the remote AI engine. For example, referring FIG. 5B, the robotics AI engine 502 may use the selection information to determine (at 521) the pick point of the object (e.g., sphere). In certain aspects, the selection information may indicate a location, a position, an area, or a region on the sphere on to which the robotic device 518 may attach in order to move the object (e.g., sphere).

At 626, the robotics AI engine may receive an indication that the pick point of the object is unable to be determined by the remote AI engine. For example, referring to FIG. 5C, the remote AI engine 510 may indicate (at 519b) that the pick point of the object (e.g., sphere) cannot be determined.

At 628, the robotics AI engine may provide the image data associated with the object to the user device upon receiving the indication. For example, referring to FIG. 5D, the robotics AI engine 502 may provide (at 523) the image data associated with the object to the user device 508 when the remote AI engine 510 is unable to select the pick point.

At 630, the robotics AI engine receive, from the user device, selection information for selecting the pick point of the object. For example, referring to FIG. 5D, the robotics AI engine 502 may receive (at 525) selection information from the user device 508.

Figure 6D:
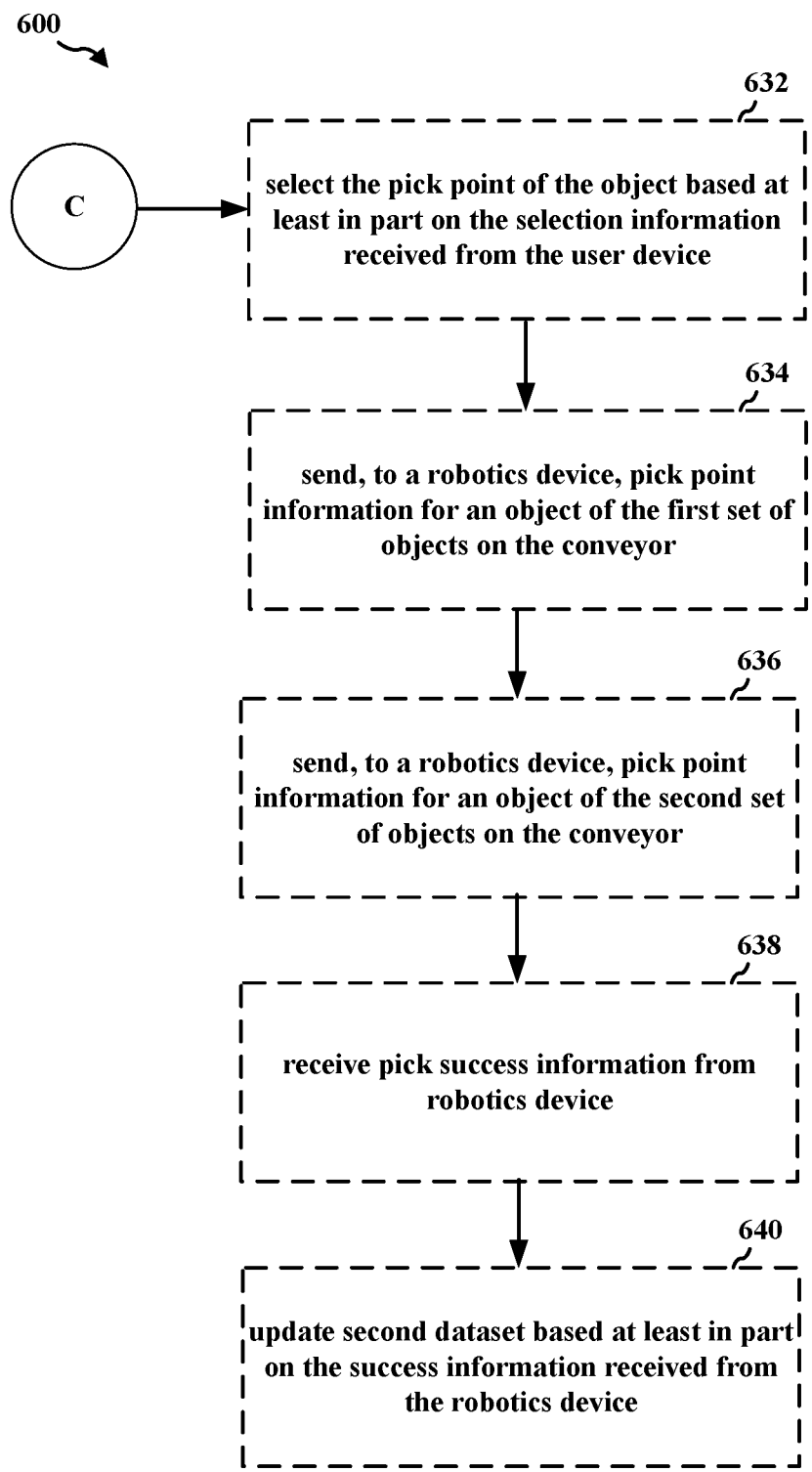

Referring to FIG. 6D, at 632, the robotics AI engine may determine the pick point of the object based at least in part on the selection information received from the user device. For example, referring to FIG. 5D, using the selection information, the robotics AI engine 502 may determine (at 527) the pick point of the object (e.g., sphere).

At 634, the robotics AI engine may send, to a robotics device, pick point information for an object of the first set of objects. In certain aspects, the pick point information may be associated with the first selection process. For example, referring FIG. 5D, the robotics AI engine 502 may send (at 541) pick point information for a particular object (e.g., a box or a sphere) to the robotics device 518.

At 636, the robotics AI engine may send, to a robotics device, pick point information for an object of the second set of objects. In certain aspects, the pick point information may be associated with the second selection process. For example, referring to FIG. 5D, the robotics AI engine 502 may send (at 541) pick point information for a particular object (e.g., a box or a sphere) to the robotics device 518.

At 638, the robotics AI engine may receive, from the robotics device, success information associated with the pick point information. For example, referring to FIG. 5E, the robotics device 510 indicate (at 545a, 545b), to the robotics AI engine 502 and the remote AI engine 510, whether the object (e.g., box or sphere) was picked up.

At 640, the robotics AI engine may update the first dataset and/or the second dataset based at least in part on the success information. For example, referring to FIG. 5E, the robotics AI engine 502 and/or the remote AI engine 510 may update (at 547, 549) the first dataset and/or second dataset to indicate which selected pick points were successful and which were unsuccessful.

Figure 7:
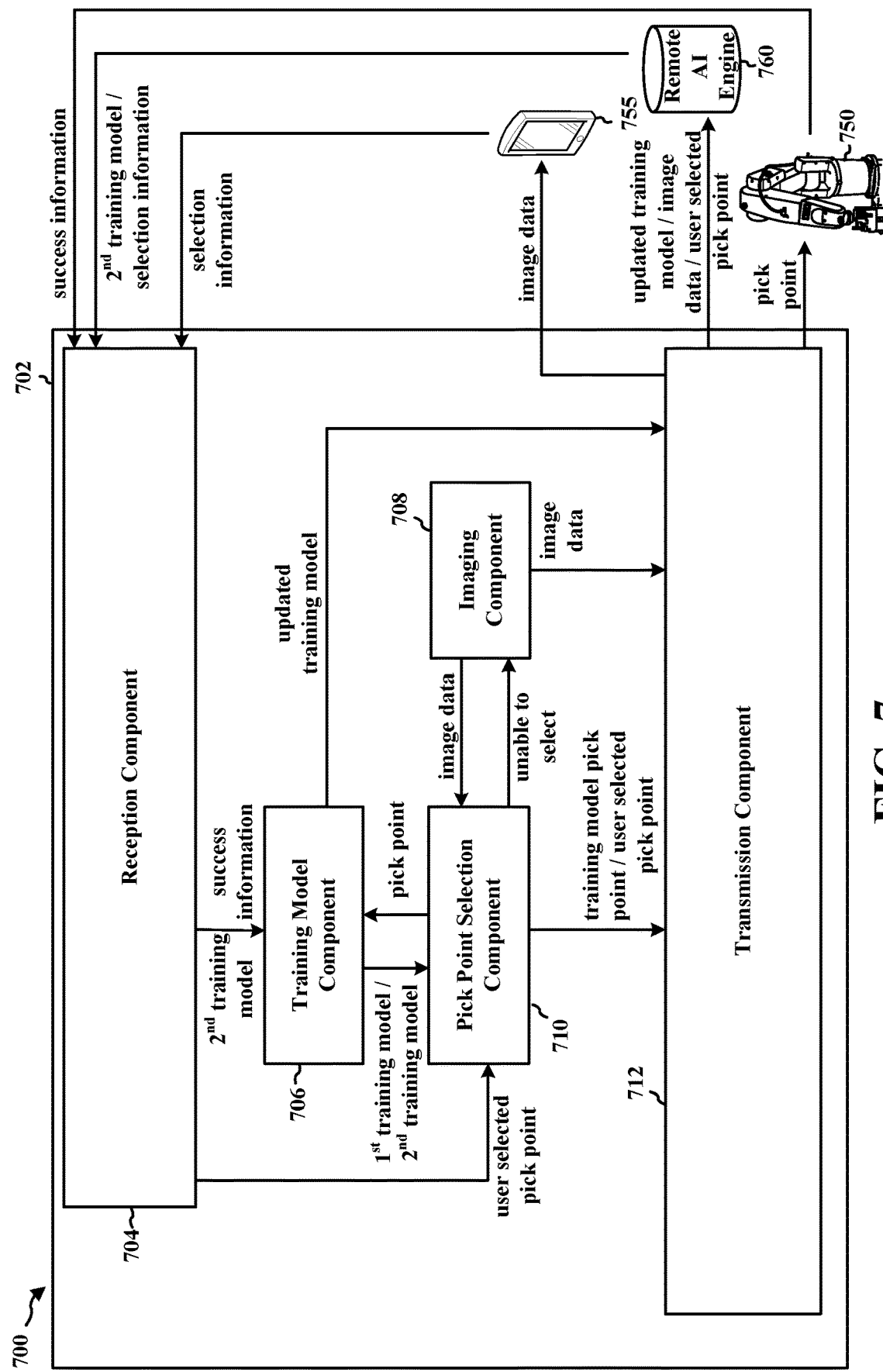
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a remote AI engine (e.g., remote AI engine 102, 302, 502, computing device 200, the apparatus 702') in communication with a robotics device 750 (e.g., robotics device 118, 318, 518, the computing device 200), a user device 755 (e.g., user device 108a, 108b, 108c, 308, 508, 1055, the computing device 200), and a remote AI engine 760 (e.g., remote AI engine 110, 510, the computing device 200, the apparatus 1002/1002'). The apparatus may include a reception component 704, a training model component 706, imaging component 708, pick point selection component 710, and transmission component 712.

Training model component 706 may be configured to obtain a first dataset for use in selecting pick points for a first set of objects. Pick point selection component 710 may be configured to access the first dataset maintained at the training model component 706.

Pick point selection component 710 may be configured to perform a first pick point selection process for the first set of objects. In certain aspects, the pick point selection component 710 may be configured to perform the first pick point selection process for the first set of objects by determining whether a pick point of an object can be selected using the first dataset and image information associated with the object.

Upon determining that a pick point may be selected, a signal indicating the pick point for the object may be sent to the training model component 706. In certain other aspects, the training model component 706 may be configured to perform a first pick point selection process for the first set of objects by generating an updated first dataset based at least in part on the signal indicating the pick point for the object. A signal associated with the updated first dataset and a related image dataset may be sent to the transmission component 712. Transmission component 712 may be configured to send, to the remote AI engine 760, the updated first dataset and an image dataset associated with objects in the first set of objects for which pick points are selected using the first dataset.

Otherwise, upon determining that a pick point is unable to be selected, a signal indicating that a pick point is unable to be selected may be sent to the imaging component 708. Imaging component 708 may be configured to send image data associated with the object to transmission component 712. Transmission component 712 may be configured to send the image data associated with the object to at least one of the user device 755 or the remote AI engine 760.

Reception component 704 may receive, from the remote AI engine 760, a second dataset for use in selecting pick points for a second set of objects. In certain aspects, the second dataset may be different than the first dataset, and the second data set may be received when the remote AI engine 760 successfully selects the pick points for the portion of the first set of objects using the first dataset and the image dataset. A signal associated with the second dataset may be sent to the training model component 706. Pick point selection component 710 may be configured to access the second dataset and may be configured to perform a second pick point selection process for the second set of objects based at least in part on the second dataset.

In certain configurations, reception component 704 may be configured to receive, from the user device 755, selection information for selecting the pick point of the object. In certain other configurations, reception component 704 may be configured to receive, from the remote AI engine 760, selection information for selecting the pick point of the object. The selection information may be sent to the pick point selection component 710. Reception component 704 may be configured to receive an indication that the pick point of the object is unable to be determined by the remote AI engine 760. The indication may be sent to the imaging component 710. Imaging component 710 may be configured to provide, via transmission component 712, image data associated with the object to the user device 755. Pick point selection component 710 be configured to determine the pick point of the object based at least in part on the selection information received from either the user device 755 or the remote AI engine 760.

Pick point selection component 708 may be configured to send, via transmission component 712, pick point information for an object of the second set of objects to the robotics device 750. Reception component 704 may receive, from the robotics device 750, success information associated with the pick point information. The success information may be sent to the training model component 706. Training model component 706 may be configured to update the first dataset and/or the second dataset based at least in part on the success information.

The apparatus may include additional components that perform each of the blocks of the algorithm in the aforementioned flowcharts of FIGS. 6A-6D. As such, each block in the aforementioned flowcharts of FIGS. 6A-6D may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
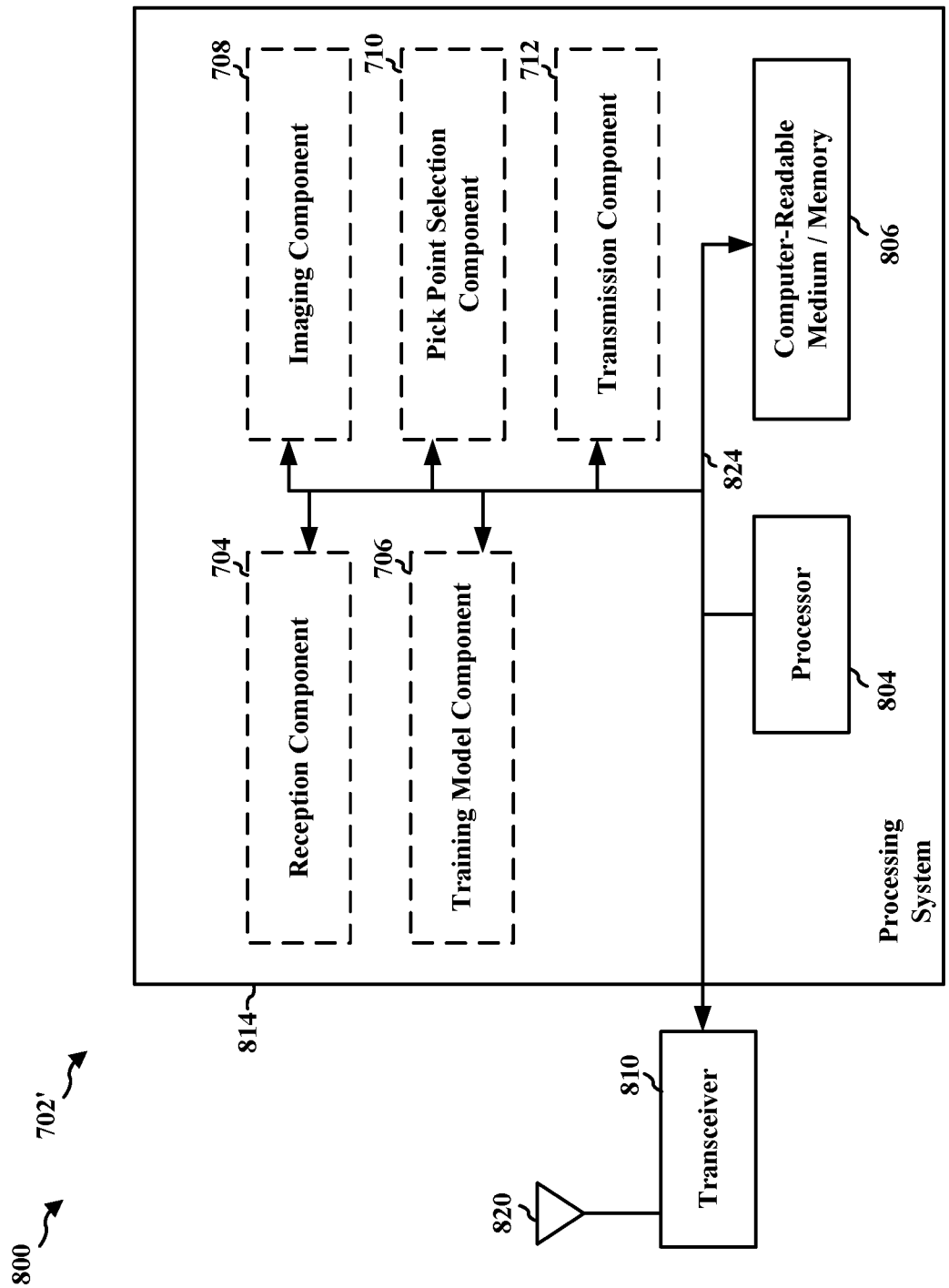
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 712, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712. The components may be software components running in the processor 804, resident/stored in the computer readable medium/memory 806, one or more hardware components coupled to the processor 804, or some combination thereof.

The aforementioned means may be the processor(s) 202, the radio 230, the MMU 240, the WLAN controller 250/short-range communication controller 252/the WWAN controller 256, one or more of the aforementioned components of the robot or robotics AI engine 102, the apparatus 702 and/or the processing system 814 of the apparatus 702' configured to perform the functions recited by the aforementioned means.

Figure 9A:
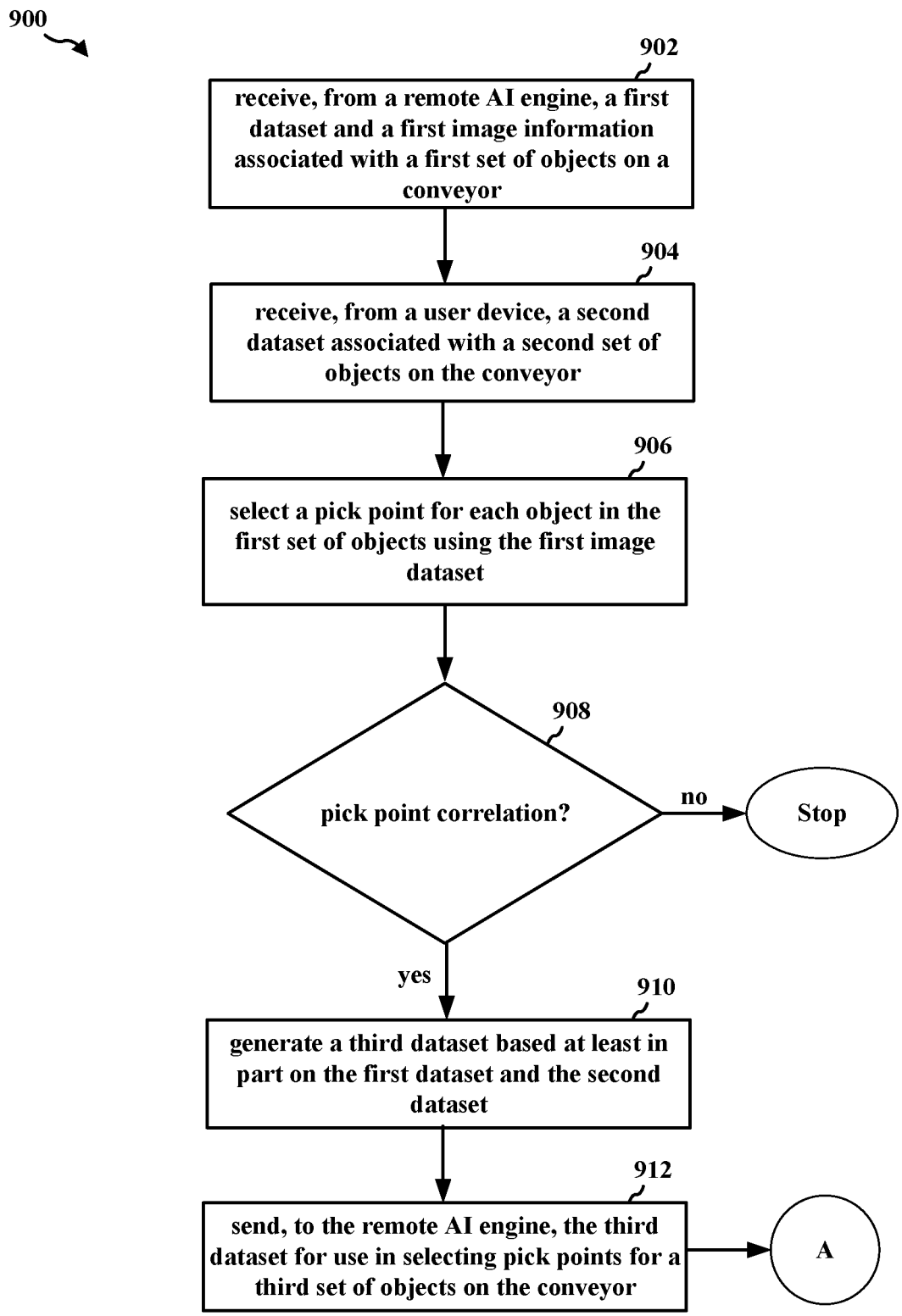
FIGS. 9A and 9B are a flowchart of a method of consolidating datasets in a robotics picking system in accordance with certain aspects of the disclosure.
Figure 9B:
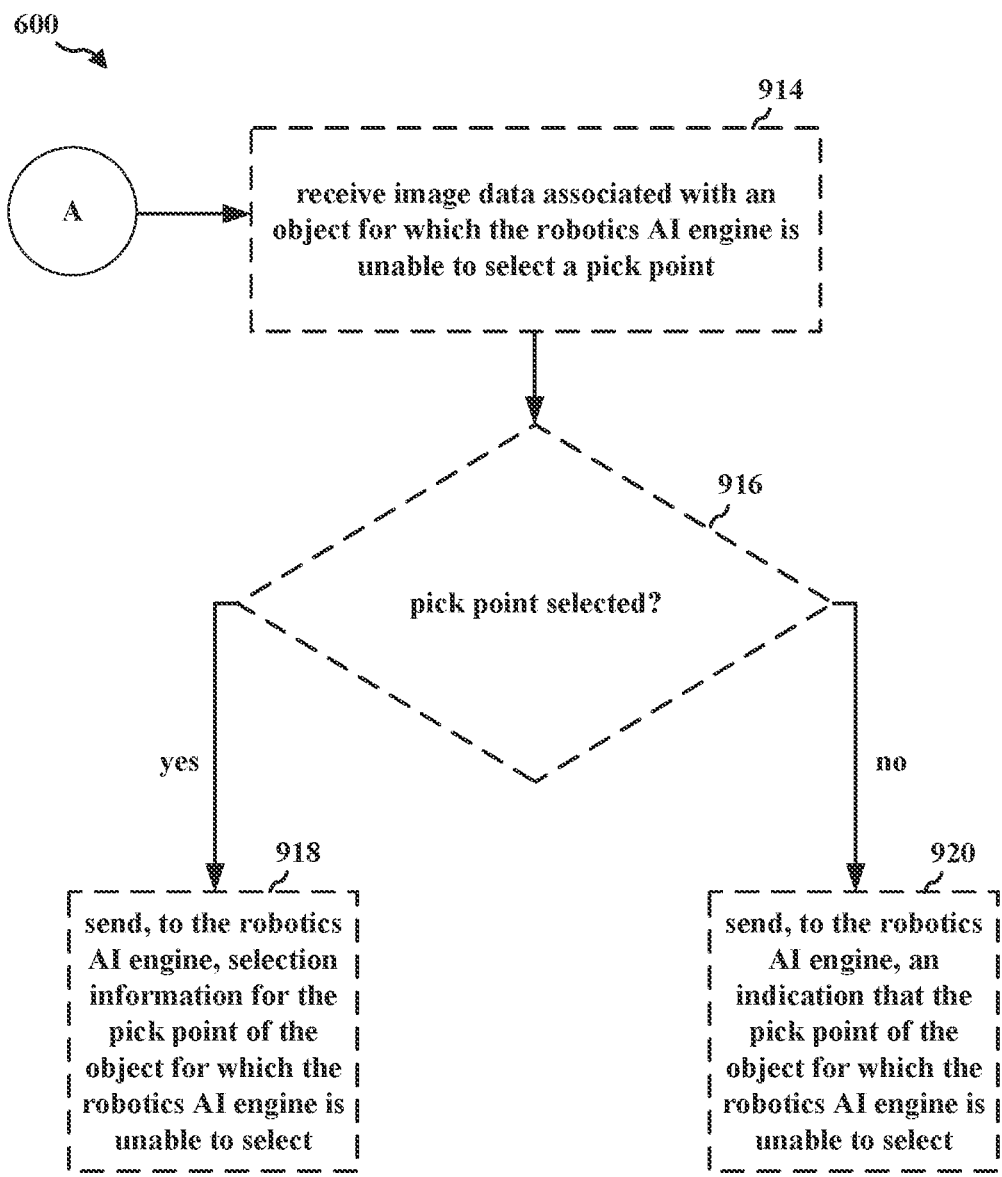

FIGS. 9A and 9B are a flowchart 900 of a method of consolidating datasets in an AI picking system in accordance with certain aspects of the disclosure. The method may be performed by a remote AI engine, e.g., remote AI engine 110, 510, 760, computing device 200, the apparatus 1002/1002'. In FIGS. 9A and 9B, optional operations may be indicated with dashed lines.

Referring to FIG. 9A, at 902, the remote AI engine may receive, from a robotics AI engine, a first dataset and a first image information associated with a first set of object. For example, referring to FIG. 5C, the robotics AI engine 502 may provide (at 529) one or more of the updated first dataset generated (at 507), the image dataset associated with the updated first dataset, or a user dataset that includes selection information received from the user device 508. In certain configurations, the robotics AI engine 502 may provide (at 529) the information to the remote AI engine 510 continuously, periodically, or in batches.

At 904, the remote AI engine may receive, from a user device or the robotics AI engine, a second dataset (e.g., user dataset) associated with a second set of objects. For example, referring to FIG. 5C, the robotics AI engine 502 may provide (at 529) one or more of the updated first dataset generated (at 507), the image dataset associated with the updated first dataset, or a user dataset that includes selection information received from the user device 508. In certain configurations, the robotics AI engine 502 may provide (at 529) the information to the remote AI engine 510 continuously, periodically, or in batches.

At 906, the remote AI engine may select a pick point for each object in the first set of objects using the first image dataset. For example, referring to FIG. 5C, the remote AI engine 510 may select (at 531) a pick point for each object in the first set of objects (e.g., the plurality of boxes for which the robotics AI engine 502 was able to select a pick point) using the first image dataset (e.g., the image dataset that correlates to the boxes for which the robotics AI engine 502 was able to select pick points).

At 908, the remote AI engine may determine whether the pick point selected for each object in the first set objects correlates to the pick point selected by the robotics AI engine for each object in the first set of objects. For example, referring to FIG. 5D, the remote AI engine 510 may determine (at 533) whether its selected pick points correlate to the corresponding pick points selected by the robotics AI engine 502. IN certain aspects, the remote AI engine 510 may compare its selected pick points to those indicated in the updated first dataset sent by the robotics AI engine 502.

At 910, the remote AI engine may generate a third dataset (e.g., the second dataset described in connection in FIGS. 5A-5E) based at least in part on the first dataset and the second dataset (e.g., user dataset) upon determining (at 908) that the pick point selected for each object in the first set of objects correlates to the pick point selected by the robotics AI engine for each object in the first set of objects. For example, upon determining that the accuracy of pick points selected by the remote AI engine 510 is within a threshold (e.g., up to or more than 95%), the remote AI engine 510 may generate (at 535) the second dataset that includes a correlation between box pick point selection factors (e.g., height, width, length, weight, etc.)/box pick points and a correlation between sphere pick point selection factors (e.g., diameter, weight, etc.)/sphere pick points.

At 912, the remote AI engine may send, to the robotics AI engine, the third dataset (e.g. the second dataset described in connection with FIGS. 5A-5E) for use in selecting pick points for a third set of objects (e.g., boxes and spheres). For example, referring to FIG. 5D, the second dataset may be sent (at 537) to the robotics AI engine 502 for use in performing (at 539) a second pick point selection process that may be useable for a larger variety of objects, e.g., for selecting pick points for both boxes and spheres without requesting user intervention.

Referring to FIG. 9B, at 914, the remote AI engine may receive image data associated with an object for which the robotics AI engine is unable to select a pick point. For example, referring to FIG. 5B, the first pick point selection process may be performed by, e.g., providing (at 515) the image data (e.g., 2-D image, 3-D image, video data, etc.) associated with the object (e.g., a sphere) to or the remote AI engine 510.

At 916, the remote AI engine may determine whether the pick point of the object for which the robotics AI engine is unable to select can be selected by a remote AI engine. For example, at FIG. 5B, the remote AI engine 510 may use the image data to determine (at 517) whether a pick point for the object (e.g., sphere) may be selected based on a dataset (e.g., the first dataset, an updated dataset, or a different dataset) accessible to the remote AI engine 510.

At 918, the remote AI engine may send, to the robotics AI engine, an indication that the pick point of the object for which the robotics AI engine is unable to select upon determining (at 916) that the remote AI engine is also unable to be selected by the remote AI engine. For example, referring to FIG. 5B, upon determining (at 517) that a pick point for the object (e.g., a sphere) may be selected, the remote AI engine 510 may provide (at 519a) selection information associated with the pick point to the robotics AI engine 502.

At 920, the remote AI engine may send, to the robotics AI engine, selection information for the pick point of the object for which the robotics AI engine is unable to select upon determining (at 916) that the remote AI engine is able to select the pick point of the object. For example, referring to FIG. 5B, upon determining (at 517) that a pick point for the object (e.g., sphere) may not be selected, the remote AI engine 510 may indicate (at 519b) that the pick point of the object (e.g., sphere) cannot be determined.

Figure 10:
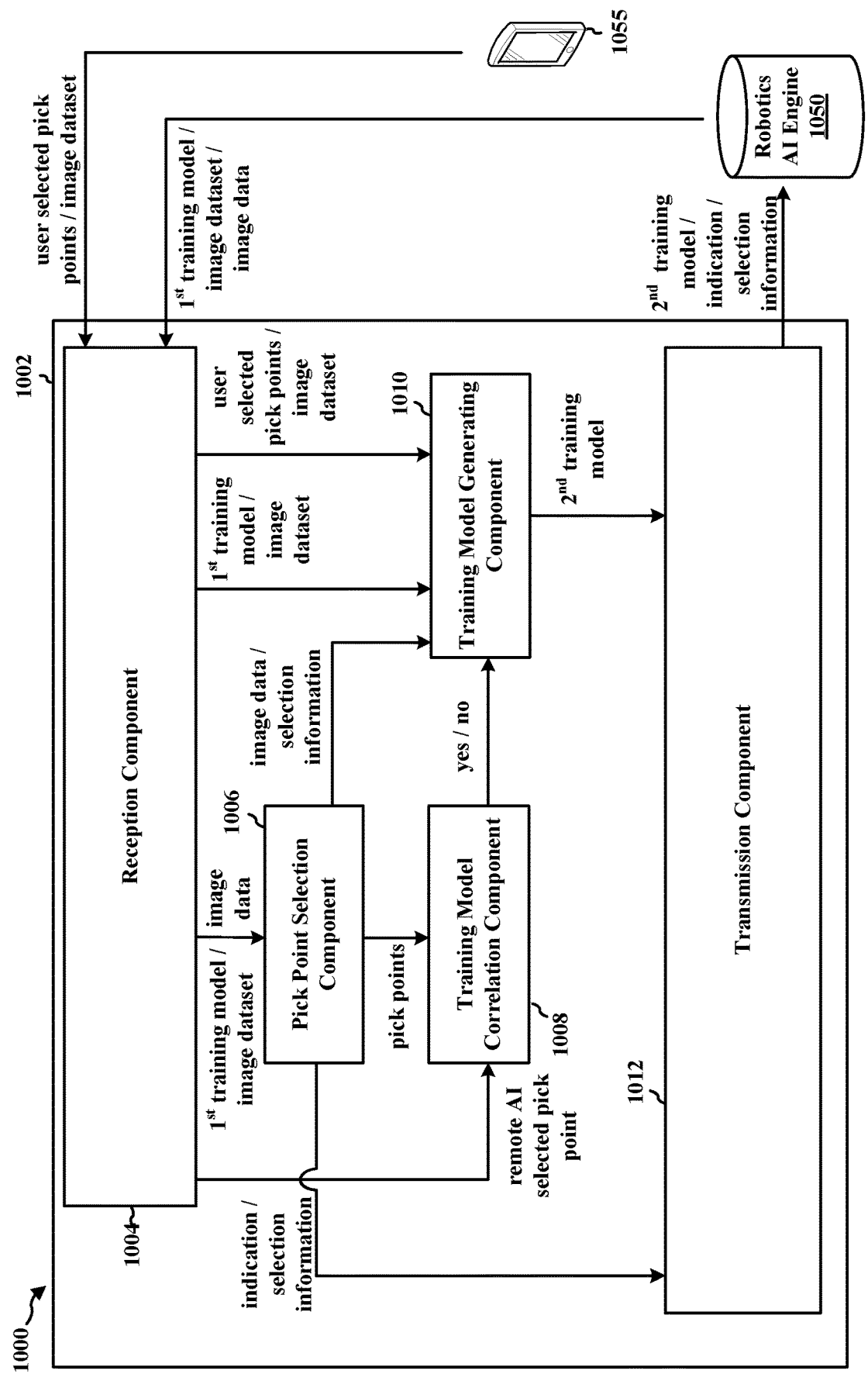
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a remote AI engine (e.g., remote AI engine 110, 510, the computing device 200, apparatus 1002') in communication with a robotics AI engine 1050 (e.g., robot or robotics AI engine 102, 502, the computing device 200, the apparatus 702/702') and a user device 1055 (e.g., user device 108a, 108b, 108c, 308, 508, 755, the computing device 200). The apparatus includes a reception component 1004, a pick point selection component 1006, a training model correlation component 1008, a training model generating component 1010, and a transmission component 1012.

Reception component 1004 may be configured to receive, from a robotics AI engine 1050, a first dataset and a first image information associated with a first set of object. Reception component 1004 may be configured to receive, from a user device 1055 or the robotics AI engine 1050, a second dataset (e.g., user dataset) associated with a second set of objects. The first dataset, second dataset, and first image information may be sent to pick point selection component 1006.

Pick point selection component 1006 may be configured to select a pick point for each object in the first set of objects using the first image dataset. A signal associated with the selected pick points may be sent to the training model correlation component 1008.

Training model correlation component 1008 may be configured to determine whether the pick point selected for each object in the first set objects correlates to the pick point selected by the robotics AI engine 1050 for each object in the first set of objects. A signal indicating whether the pick points selected correspond to within a threshold may be sent to the training model generating component 1010.

Training model generating component 1010 may be configured to generate a third dataset based at least in part on the first dataset and the second dataset when the signal indicates that the selected pick points correlate to within the threshold.

Training model generating component 1010 may be configured to send, via transmission component 1012, the third dataset for use in selecting pick points for a third set of objects to the robotics AI engine 1050.

Reception component 1004 may be configured to receive image data associated with an object for which the robotics AI engine is unable to select a pick point. The image data may be sent to the pick point selection component 1006. Pick point selection component 1006 may be configured to determine whether the pick point of the object for which the robotics AI engine is unable to select can be selected by a remote AI engine.

Pick point selection component 1006 may be configured to send, to the robotics AI engine 1050, an indication that the pick point of the object for which the robotics AI engine is unable to select upon determining that it is also unable to be selected. The indication may be sent via transmission component 1012. Pick point selection component 1006 may be configured to send, to the robotics AI engine 1050, selection information for the pick point of the object for which the robotics AI engine is unable to select upon determining that a pick point can be selected. The selection information may be sent via transmission component 1012.

The apparatus may include additional components that perform each of the blocks of the algorithm in the aforementioned flowcharts of FIGS. 9A and 9B. As such, each block in the aforementioned flowcharts of FIGS. 9A and 9B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
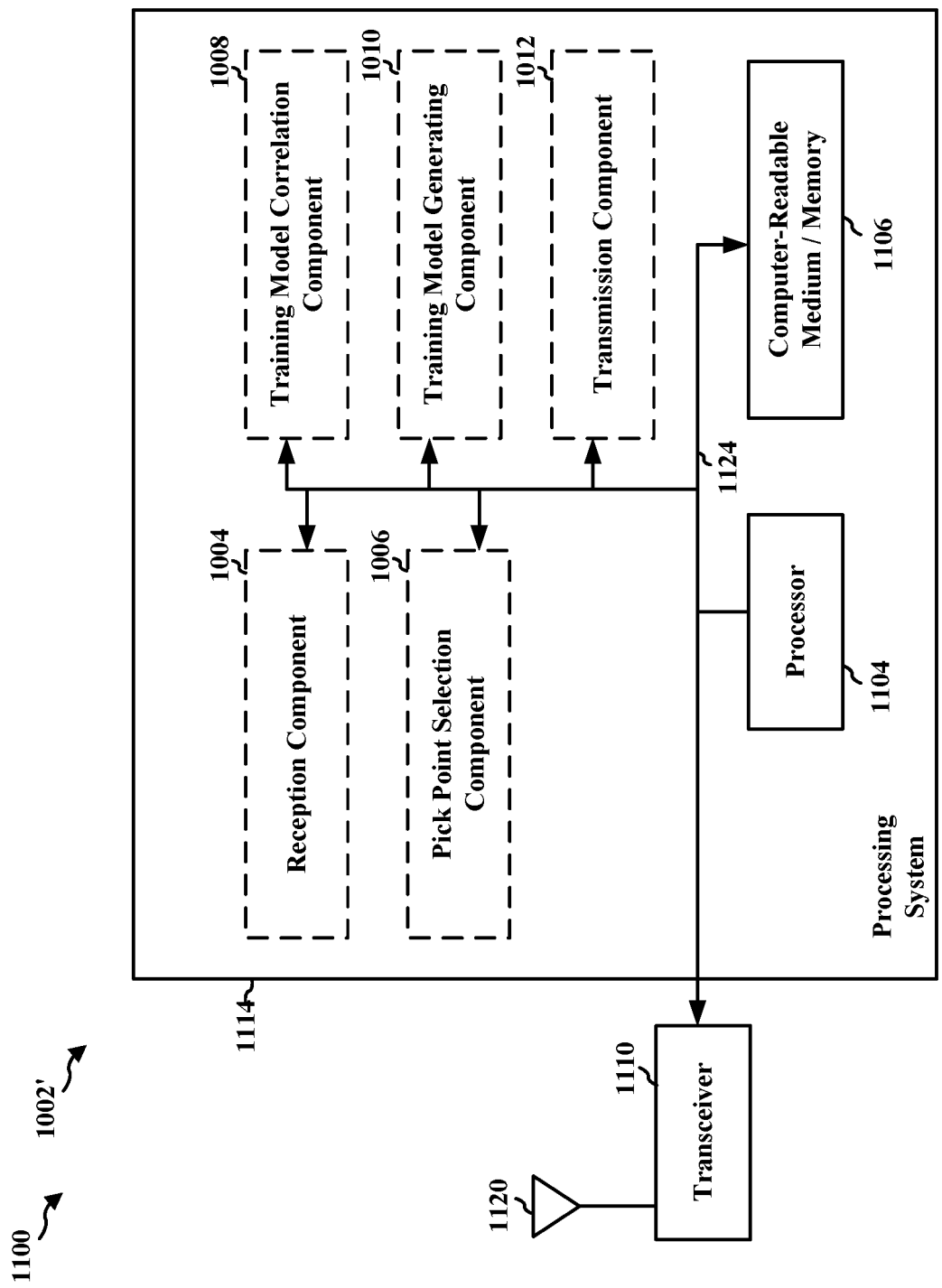
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1012, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof.

The aforementioned means may be the processor(s) 202, the radio 230, the MMU 240, the WLAN controller 250/short-range communication controller 252/the WWAN controller 256, one or more of the aforementioned components of the remote AI engine 110, the apparatus 1002 and/or the processing system 1114 of the apparatus 1002' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "component," "mechanism," "element," "device," and the like may not be a substitute for the word "means." As such, no claim element is to be construed as a means plus function unless the element is expressly recited using the phrase "means for."

What is claimed is:

1. A computer-implemented method, comprising:
   maintaining a first dataset configured to select a first set of pick points for a first set of objects;
   receiving a user dataset including a user selected pick point associated with a first object and a first image of the first object;
   generating a second dataset based at least in part on the first dataset and the user dataset, the second dataset configured to select pick points for a second set of objects, the second set of objects including at least the first object and the first set of objects;
   receiving a query image of a second object;

selecting a second set of pick points for the second object using the second dataset and the query image of the second object; and determining whether the second set of pick points correspond to the first set of pick points to within a threshold.

2. The computer-implemented method of claim 1, further comprising:

determining the second set of pick points corresponds to the first set of pick points within the threshold; and maintaining the second dataset configured to select the second set of pick points for the second set of objects.

3. The computer-implemented method of claim 1, further comprising:

determining the second set of pick points fails to correspond to the first set of pick points within the threshold; and updating the second dataset, to generate a third dataset, by adding a data point that correlates the second set of pick points for the second object to a second set of pick point selection factors.

4. The computer-implemented method of claim 1, further comprising:

determining the second set of pick points corresponds to the first set of pick points within the threshold; and providing the second set of pick points to a robotics AI engine.

5. The computer-implemented method of claim 1, wherein the first set of objects is associated with a first type of object, and the second set of objects associated with a second type of object.

6. The computer-implemented method of claim 5, wherein the first type of object is associated with a first set of pick points selection factors, and the second type of object is associated with a second set of pick point selection factors, and wherein the first set of pick point selection factors and the second set of pick point selection factors are different.

7. The computer-implemented method of claim 6, wherein the first set of pick point selection factors include at least one of a first shape, a first weight, a first size, a first orientation, or a first material, and wherein the second set of pick point selection factors include at least one of a second shape, a second weight, a second size, a second orientation, or a second material.

8. The computer-implemented method of claim 6, wherein the first dataset is associated with a first look up table operable to correlate the first set of pick points to the first set of pick point selection factors, the second dataset associated with a second look up table operable to correlate the second set of pick points to the second set of pick point selection factors.

9. The computer-implemented method of claim 1, wherein the first set of pick points and the second set of pick points correspond to positions on a surface of an object.

10. The computer-implemented method of claim 1, further comprising:

determining the first set of pick points is unable to pick up the first object; and generating a request for the user dataset.

11. An apparatus for pick point selection, comprising:

a memory; and at least one processor coupled to the memory and configured to:

maintain a first dataset configured to select a first set of pick points for a first set of objects;

receive a user dataset including a user selected pick point associated with a first object and a first image of the first object;

generate a second dataset based at least in part on the first dataset and the user dataset, the second dataset configured to select pick points for a second set of objects, the second set of objects including at least the first object and the first set of objects;

receive a query image of a second object;

select a second set of pick points for the second object using the second dataset and the query image of the second object; and determine whether the second set of pick points correspond to the first set of pick points to within a threshold.

12. The apparatus of claim 11, wherein the at least one processor is further configured to:

determine the second set of pick points corresponds to the first set of pick points within the threshold; and maintain the second dataset configured to select the second set of pick points for the second set of objects.

13. The apparatus of claim 11, wherein the at least one processor is further configured to:

determine the second set of pick points fails to corresponds to the first set of pick points within the threshold; and update the second dataset, to generate a third dataset, by adding a data point that correlates the second set of pick points for the second object to a second set of pick point selection factors.

14. The apparatus of claim 11, wherein the at least one processor is further configured to:

determine the second set of pick points corresponds to the first set of pick points within the threshold; and provide the second set of pick points to a robotics AI engine.

15. The apparatus of claim 11, wherein the at least one processor is further configured to:

determine the first set of pick points is unable to pick up the first object; and generate a request for the user dataset.

16. The apparatus of claim 11, wherein the first set of objects is associated with a first type of object, and the second set of objects associated with a second type of object.

17. A non-transitory computer readable storage medium storing instructions that, when executed by at least one processor of a computing system, causes the computing system to:

maintain a first dataset configured to select a first set of pick points for a first set of objects;

receive a user dataset including a user selected pick point associated with a first object and a first image of the first object;

generate a second dataset based at least in part on the first dataset and the user dataset, the second dataset configured to select pick points for a second set of objects, the second set of objects including at least the first object and the first set of objects;

receive a query image of a second object;

select a second set of pick points for the second object using the second dataset and the query image of the second object; and determine whether the second set of pick points correspond to the first set of pick points to within a threshold.

18. The non-transitory computer readable storage medium of claim 17, wherein the instructions, when executed by the at least one processor, further enables the computing system to:
    determine the second set of pick points corresponds to the first set of pick points within the threshold; and
    maintain the second dataset configured to select the second set of pick points for the second set of objects.

19. The non-transitory computer readable storage medium of claim 17, wherein the instructions, when executed by the at least one processor, further enables the computing system to:
    determine the second set of pick points fails to correspond to the first set of pick points within the threshold; and
    update the second dataset, to generate a third dataset, by adding a data point that correlates the second set of pick points for the second object to a second set of pick point selection factors.

20. The non-transitory computer readable storage medium of claim 17, wherein the instructions, when executed by the at least one processor, further enables the computing system to:
    determine the second set of pick points corresponds to the first set of pick points within the threshold; and
    provide the second set of pick points to a robotics AI engine.

* * * * *